United States Patent
Lei et al.

(10) Patent No.: US 10,863,543 B2
(45) Date of Patent: Dec. 8, 2020

(54) SUBBAND BASED UPLINK ACCESS FOR NR-SS

(71) Applicant: QUALCOMM Incorporated, San Diego, CA (US)

(72) Inventors: Jing Lei, San Diego, CA (US); Jing Sun, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/204,800

(22) Filed: Nov. 29, 2018

(65) Prior Publication Data

US 2019/0174542 A1 Jun. 6, 2019

Related U.S. Application Data

(60) Provisional application No. 62/593,671, filed on Dec. 1, 2017.

(51) Int. Cl.
*H04W 74/08* (2009.01)
*H04L 5/00* (2006.01)
(Continued)

(52) U.S. Cl.
CPC ......... *H04W 74/0816* (2013.01); *H04L 5/001* (2013.01); *H04L 5/006* (2013.01);
(Continued)

(58) Field of Classification Search
None
See application file for complete search history.

(56) References Cited

U.S. PATENT DOCUMENTS

| | | | | | |
|---|---|---|---|---|---|
| 5,583,852 | A | * | 12/1996 | Ikeda | H04B 1/7075 342/146 |
| 5,793,983 | A | * | 8/1998 | Albert | H04L 1/0007 340/2.23 |

(Continued)

FOREIGN PATENT DOCUMENTS

WO WO-2017194465 A1 11/2017

OTHER PUBLICATIONS

International Search Report and Written Opinion—PCT/US2018/063281—ISA/EPO—dated Jun. 24, 2019.
(Continued)

*Primary Examiner* — Bunjob Jaroenchonwanit
(74) *Attorney, Agent, or Firm* — Liem T. Do

(57) ABSTRACT

Subband based uplink access for new radio (NR) shared spectrum (NR-SS) is disclosed. A base station performs a listen before talk (LBT) procedure on system allocated subbands of a shared communication channel. The base station determines a first set of candidate subbands that are signaled to a user equipment (UE). The UE performs an LBT procedure on the first set to identify a second set of candidate subbands including the successful LBT subbands of the first set. Aspects of the disclosure provide for managing and refining the subbands for transmissions. A first aspect provides the UE to determine a transmission behavior based on mismatch between the first and second sets. A second aspect provides the first and second sets in handshaking between the base station and UE for refining the eventual transmission set of subbands. A third aspect provides cross-band LBT reporting for further refining subband selection in later slots.

22 Claims, 13 Drawing Sheets

(51) Int. Cl.
*H04L 27/00* (2006.01)
*H04W 74/00* (2009.01)
*H04W 72/12* (2009.01)
*H04W 16/14* (2009.01)

(52) U.S. Cl.
CPC .......... *H04L 5/0042* (2013.01); *H04L 5/0044* (2013.01); *H04L 5/0053* (2013.01); *H04L 27/0006* (2013.01); *H04W 74/006* (2013.01); *H04W 74/0808* (2013.01); *H04W 16/14* (2013.01); *H04W 72/1289* (2013.01)

(56) References Cited

U.S. PATENT DOCUMENTS

| | | | | |
|---|---|---|---|---|
| 5,999,818 | A * | 12/1999 | Gilbert | H04W 16/00 455/448 |
| 6,208,657 | B1 * | 3/2001 | Dendi | H04Q 3/0025 370/401 |
| 6,535,738 | B1 * | 3/2003 | Bomar | H04W 36/18 370/331 |
| 6,580,913 | B1 * | 6/2003 | Chao | H04W 16/10 455/186.1 |
| 7,774,493 | B1 * | 8/2010 | Damle | H04L 45/50 709/236 |
| 8,457,646 | B2 * | 6/2013 | Kim | H04W 16/04 455/436 |
| 10,142,986 | B2 * | 11/2018 | Yu | H04W 72/14 |
| 10,455,427 | B2 * | 10/2019 | Cui | H04W 16/14 |
| 2003/0159142 | A1 * | 8/2003 | Howe | H04N 7/165 725/38 |
| 2004/0076176 | A1 * | 4/2004 | Kfir | H04J 3/1611 370/465 |
| 2009/0147786 | A1 * | 6/2009 | Li | H04L 12/185 370/390 |
| 2009/0207800 | A1 * | 8/2009 | Shan | H04W 72/00 370/329 |
| 2009/0252262 | A1 * | 10/2009 | Gu | H04L 27/0014 375/344 |
| 2010/0330951 | A1 * | 12/2010 | Chen | H04W 4/90 455/404.1 |
| 2011/0085475 | A1 * | 4/2011 | Sinivaara | H04L 45/308 370/277 |
| 2011/0292856 | A1 * | 12/2011 | Park | H04W 68/00 370/311 |
| 2012/0120846 | A1 * | 5/2012 | Hwang | H04W 24/10 370/254 |
| 2012/0147773 | A1 * | 6/2012 | Kim | H04L 1/0025 370/252 |
| 2013/0148706 | A1 * | 6/2013 | Cheng | H04L 1/0019 375/219 |
| 2014/0314044 | A1 * | 10/2014 | Kim | H04W 8/005 370/330 |
| 2015/0036640 | A1 * | 2/2015 | Seok | H04W 76/14 370/329 |
| 2015/0049709 | A1 * | 2/2015 | Damnjanovic | H04L 5/0055 370/329 |
| 2015/0124638 | A1 * | 5/2015 | Sun | H04L 1/0027 370/252 |
| 2015/0163728 | A1 * | 6/2015 | Sawada | H04W 28/22 455/434 |
| 2016/0029331 | A1 * | 1/2016 | Seo | H04L 27/2613 370/350 |
| 2016/0262188 | A1 * | 9/2016 | Zhang | H04J 11/0056 |
| 2016/0302076 | A1 * | 10/2016 | Chou | H04W 16/14 |
| 2016/0302113 | A1 * | 10/2016 | Hwang | H04W 36/0072 |
| 2016/0309498 | A1 * | 10/2016 | Luo | H04W 72/1268 |
| 2016/0338053 | A1 * | 11/2016 | Park | H04W 74/0808 |
| 2016/0338096 | A1 * | 11/2016 | Vajapeyam | H04W 74/004 |
| 2016/0360553 | A1 * | 12/2016 | Cheng | H04W 16/14 |
| 2017/0094683 | A1 | 3/2017 | Sun et al. | |
| 2017/0118728 | A1 * | 4/2017 | Harada | H04W 52/38 |
| 2017/0257851 | A1 * | 9/2017 | Ye | H04L 1/1861 |
| 2017/0289869 | A1 * | 10/2017 | Nogami | H04W 36/0066 |
| 2017/0303144 | A1 * | 10/2017 | Guo | H04B 17/318 |
| 2017/0311327 | A1 | 10/2017 | Tanaka | |
| 2017/0331606 | A1 * | 11/2017 | Chen | H04L 27/0006 |
| 2018/0115991 | A1 * | 4/2018 | Yang | H04W 74/0808 |
| 2018/0115992 | A1 * | 4/2018 | Park | H04W 16/14 |
| 2018/0124811 | A1 * | 5/2018 | Yi | H04W 72/1247 |
| 2018/0199376 | A1 * | 7/2018 | Kim | H04W 74/0808 |
| 2018/0213429 | A1 * | 7/2018 | Zhang | H04W 24/02 |
| 2018/0235000 | A1 * | 8/2018 | Damnjanovic | H04W 72/1284 |
| 2018/0270834 | A1 * | 9/2018 | Falconetti | H04B 17/345 |
| 2018/0310193 | A1 * | 10/2018 | Bhorkar | H04B 7/0456 |
| 2018/0317256 | A1 * | 11/2018 | Um | H04W 74/0808 |
| 2018/0332618 | A1 * | 11/2018 | Kakishima | H04B 7/0626 |
| 2018/0376434 | A1 * | 12/2018 | Cui | H04W 72/1289 |
| 2019/0014596 | A1 * | 1/2019 | Yang | H04W 72/0446 |
| 2019/0053222 | A1 * | 2/2019 | Bhorkar | H04W 16/14 |
| 2019/0090276 | A1 * | 3/2019 | Lee | H04L 5/0051 |
| 2019/0104514 | A1 * | 4/2019 | Chendamarai Kannan | H04L 5/0048 |
| 2019/0174546 | A1 * | 6/2019 | Jeon | H04W 74/0816 |
| 2019/0208544 | A1 * | 7/2019 | Jia | H04W 72/10 |
| 2019/0215867 | A1 * | 7/2019 | Cheng | H04W 8/005 |
| 2019/0246412 | A1 * | 8/2019 | Noh | H04L 5/14 |
| 2019/0246427 | A1 * | 8/2019 | Mukherjee | H04L 5/001 |
| 2019/0289621 | A1 * | 9/2019 | Li | H04W 72/042 |
| 2019/0313451 | A1 * | 10/2019 | Liu | H04W 72/04 |
| 2019/0342915 | A1 * | 11/2019 | Kim | H04W 72/0446 |
| 2019/0357224 | A1 * | 11/2019 | Li | H04B 17/345 |
| 2019/0364550 | A1 * | 11/2019 | Lei | H04W 72/082 |
| 2019/0364581 | A1 * | 11/2019 | Anderson | H04W 72/1226 |
| 2019/0364613 | A1 * | 11/2019 | Babaei | H04L 5/0098 |

OTHER PUBLICATIONS

Partial International Search Report—PCT/US2018/063281—ISA/EPO—dated Apr. 4, 2019.

* cited by examiner

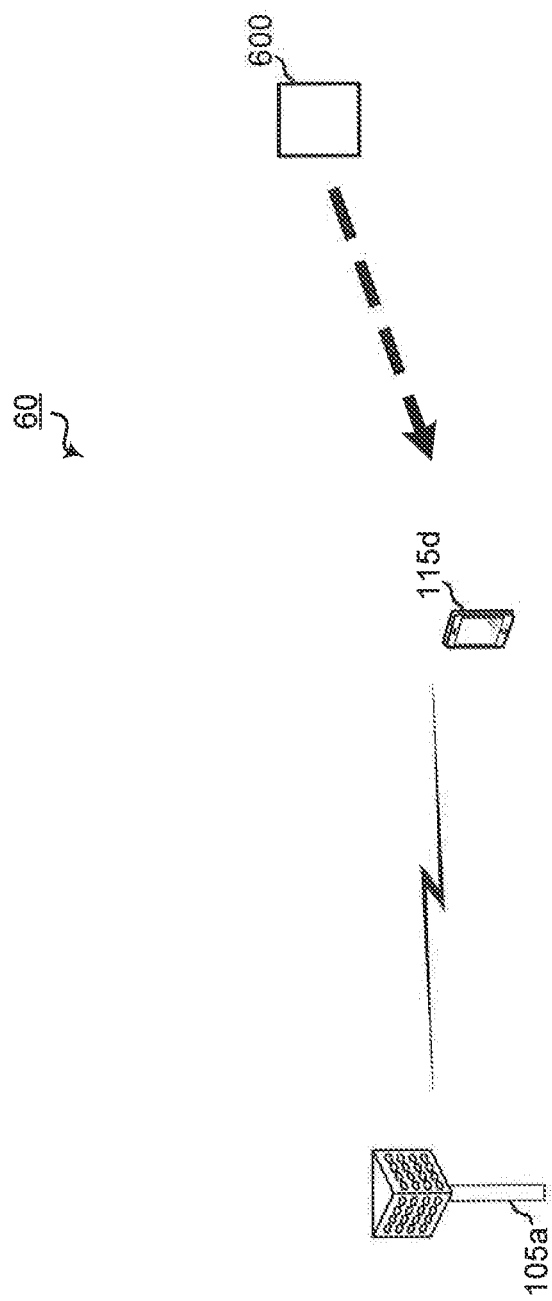

SUBBAND BASED UPLINK ACCESS FOR NR-SS

CROSS-REFERENCE TO RELATED APPLICATIONS

This application claims the benefit of U.S. Provisional Patent Application No. 62/593,671, entitled, "SUBBAND BASED UPLINK ACCESS FOR NR-SS," filed on Dec. 1, 2017, which is expressly incorporated by reference herein in its entirety.

BACKGROUND

Field

Aspects of the present disclosure relate generally to wireless communication systems, and more particularly, to subband based uplink access for new radio (NR) shared spectrum (NR-SS).

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes receiving, by a UE, an uplink grant and an identification of a first set of candidate subbands from a serving base station, wherein the identification includes a clear channel assessment (CCA) trigger for the UE, performing, by the UE, a CCA on each subband of the first set of candidate subbands, determining, by the UE, a second set of candidate subbands including one or more subbands of the first set of candidate subbands for which the CCA is successful, and preparing, by the UE, uplink transmissions in response to the second set of candidate subbands being a subset of the first set of candidate subbands.

In an additional aspect of the disclosure, a method of wireless communications includes receiving, by a UE, an uplink pre-grant signal from a serving base station, wherein the uplink pre-grant signal is received on each subband of a first set of candidate subbands, performing, by the UE, a CCA on each subband of the first set of candidate subbands, transmitting, by the UE, a CCA success indicator to the serving base station, wherein the CCA success indicator is transmitted on each subband of a second set of candidate subbands, the second set of candidate subbands including one or more subbands of the first set of candidate subbands for which the CCA was successful, receiving, by the UE, an uplink grant from the serving base station, wherein the uplink grant is received on each subband of a third set of candidate subbands, the third set of candidate subbands including one or more of the second set of candidate subbands, and transmitting, by the UE, uplink transmissions to the serving base station using a fourth set of candidate subbands, wherein the fourth set of candidate subbands includes one or more of the third set of candidate subbands.

In an additional aspect of the disclosure, a method of wireless communication includes performing, by a base station, a CCA on each subband of a set of system allocated subbands, transmitting, by the base station, an uplink pre-grant signal to the at least one UE, wherein the uplink pre-grant signal is transmitted on each subband of a first set of candidate subbands, the first set of candidate subbands including a plurality of subbands of the set of system allocated subbands for which the CCA is successful, receiving, by the base station, a CCA success indicator from the at least one UE, wherein the CCA success indicator is transmitted on each subband of a second set of candidate subbands, the second set of candidate subbands including one or more subbands of the first set of candidate subbands, transmitting, by the base station, an uplink grant to the at least one UE, wherein the uplink grant is transmitted on each subband of a third set of candidate subbands, the third set of candidate subbands including one or more of the second set of candidate subbands, and receiving, by the base station, uplink transmissions from the at least one UE using a fourth set of candidate subbands, wherein the fourth set of candidate subbands includes one or more of the third set of candidate subbands.

In an additional aspect of the disclosure, a method of wireless communication includes receiving, by a UE, an uplink grant from a serving base station, wherein the uplink grant is received on each subband of a first set of candidate subbands, performing, by the UE, a CCA on the each subband of the first set of candidate subbands, determining, by the UE, a second set of candidate subbands including one or more subbands of the first set of candidate subbands for which the CCA is successful, transmitting, by the UE, permitted uplink transmissions and a CCA outcome report on each subband of the second set of candidate subbands, wherein the permitted uplink transmissions were scheduled on a subband of the first set of candidate subbands corresponding to the each subband of the second set of candidate subbands and the CCA outcome report includes a CCA outcome for the CCA on the first set of candidate subbands, and withdrawing, by the UE, non-permitted uplink transmissions scheduled for one or more subband of the first set of candidate subbands outside of the second set of candidate subbands.

In an additional aspect of the disclosure, a method of wireless communications includes performing, by a base station, a CCA on each subband of a set of system allocated subbands, transmitting, by the base station, an uplink grant to the at least one UE, wherein the uplink grant is transmitted on each subband of a first set of candidate subbands, the first set of candidate subbands including a plurality of subbands of the set of system allocated subbands for which the CCA is successful, receiving, by the base station, uplink transmissions and a CCA outcome report from the at least one UE on each subband of a second set of candidate subbands, wherein the second set of candidate subbands includes one or more subbands of the first set of candidate subbands and the CCA outcome report includes a CCA outcome from the at least one UE for the first set of candidate subbands.

In an additional aspect of the disclosure, an apparatus configured for wireless communication includes means for receiving, by a UE, an uplink grant and an identification of a first set of candidate subbands from a serving base station, wherein the identification includes a CCA trigger for the UE, means for performing, by the UE, a CCA on each subband of the first set of candidate subbands, means for determining, by the UE, a second set of candidate subbands including one or more subbands of the first set of candidate subbands for which the CCA is successful, and means for preparing, by the UE, uplink transmissions in response to the second set of candidate subbands being a subset of the first set of candidate subbands.

In an additional aspect of the disclosure, an apparatus configured for wireless communication includes means for receiving, by a UE, an uplink pre-grant signal from a serving base station, wherein the uplink pre-grant signal is received on each subband of a first set of candidate subbands, means for performing, by the UE, a CCA on each subband of the first set of candidate subbands, means for transmitting, by the UE, a CCA success indicator to the serving base station, wherein the CCA success indicator is transmitted on each subband of a second set of candidate subbands, the second set of candidate subbands including one or more subbands of the first set of candidate subbands for which the CCA was successful, means for receiving, by the UE, an uplink grant from the serving base station, wherein the uplink grant is received on each subband of a third set of candidate subbands, the third set of candidate subbands including one or more of the second set of candidate subbands, and means for transmitting, by the UE, uplink transmissions to the serving base station using a fourth set of candidate subbands, wherein the fourth set of candidate subbands includes one or more of the third set of candidate subbands.

In an additional aspect of the disclosure, an apparatus configured for wireless communication includes means for performing, by a base station, a CCA on each subband of a set of system allocated subbands, means for transmitting, by the base station, an uplink pre-grant signal to the at least one UE, wherein the uplink pre-grant signal is transmitted on each subband of a first set of candidate subbands, the first set of candidate subbands including a plurality of subbands of the set of system allocated subbands for which the CCA is successful, means for receiving, by the base station, a CCA success indicator from the at least one UE, wherein the CCA success indicator is transmitted on each subband of a second set of candidate subbands, the second set of candidate subbands including one or more subbands of the first set of candidate subbands, means for transmitting, by the base station, an uplink grant to the at least one UE, wherein the uplink grant is transmitted on each subband of a third set of candidate subbands, the third set of candidate subbands including one or more of the second set of candidate subbands, and means for receiving, by the base station, uplink transmissions from the at least one UE using a fourth set of candidate subbands, wherein the fourth set of candidate subbands includes one or more of the third set of candidate subbands.

In an additional aspect of the disclosure, an apparatus configured for wireless communication includes means for receiving, by a UE, an uplink grant from a serving base station, wherein the uplink grant is received on each subband of a first set of candidate subbands, means for performing, by the UE, a CCA on the each subband of the first set of candidate subbands, means for determining, by the UE, a second set of candidate subbands including one or more subbands of the first set of candidate subbands for which the CCA is successful, means for transmitting, by the UE, permitted uplink transmissions and a CCA outcome report on each subband of the second set of candidate subbands, wherein the permitted uplink transmissions were scheduled on a subband of the first set of candidate subbands corresponding to the each subband of the second set of candidate subbands and the CCA outcome report includes a CCA outcome for the CCA on the first set of candidate subbands, and means for withdrawing, by the UE, non-permitted uplink transmissions scheduled for one or more subband of the first set of candidate subbands outside of the second set of candidate subbands.

In an additional aspect of the disclosure, an apparatus configured for wireless communication includes means for performing, by a base station, a CCA on each subband of a set of system allocated subbands, means for transmitting, by the base station, an uplink grant to the at least one U wherein the uplink grant is transmitted on each subband of a first set of candidate subbands, the first set of candidate subbands including a plurality of subbands of the set of system allocated subbands for which the CCA is successful, means for receiving, by the base station, uplink transmissions and a CCA outcome report from the at least one UE on each subband of a second set of candidate subbands, wherein the second set of candidate subbands includes one or more subbands of the first set of candidate subbands and the CCA outcome report includes a CCA outcome from the at least one UE for the first set of candidate subbands.

In an additional aspect of the disclosure, a non-transitory computer-readable medium having program code recorded thereon. The program code further includes code to receive, by a UE, an uplink grant and an identification of a first set of candidate subbands from a serving base station, wherein the identification includes a CCA trigger for the UE, code to perform, by the UE, a CCA on each subband of the first set of candidate subbands, code to determine, by the UE, a second set of candidate subbands including one or more subbands of the first set of candidate subbands for which the CCA is successful, and code to prepare, by the UE, uplink transmissions in response to the second set of candidate subbands being a subset of the first set of candidate subbands.

In an additional aspect of the disclosure, a non-transitory computer-readable medium having program code recorded thereon. The program code further includes code to receive, by a UE, an uplink pre-grant signal from a serving base station, wherein the uplink pre-grant signal is received on each subband of a first set of candidate subbands, code to perform, by the UE, a CCA on each subband of the first set of candidate subbands, code to transmit, by the UE, a CCA success indicator to the serving base station, wherein the CCA success indicator is transmitted on each subband of a second set of candidate subbands, the second set of candidate subbands including one or more subbands of the first set of candidate subbands for which the CCA was successful, code to receive, by the UE, an uplink grant from the serving base station, wherein the uplink grant is received on each subband of a third set of candidate subbands, the third set of candidate subbands including one or more of the second set of candidate subbands, and code to transmit, by the UE, uplink transmissions to the serving base station using a fourth set of candidate subbands, wherein the fourth set of candidate subbands includes one or more of the third set of candidate subbands.

In an additional aspect of the disclosure, a non-transitory computer-readable medium having program code recorded thereon. The program code further includes code to perform, by a base station, a CCA on each subband of a set of system allocated subbands, code to transmit, by the base station, an uplink pre-grant signal to the at least one UE, wherein the uplink pre-grant signal is transmitted on each subband of a first set of candidate subbands, the first set of candidate subbands including a plurality of subbands of the set of system allocated subbands for which the CCA is successful, code to receive, by the base station, a CCA success indicator from the at least one UE, wherein the CCA success indicator is transmitted on each subband of a second set of candidate subbands, the second set of candidate subbands including one or more subbands of the first set of candidate subbands, code to transmit, by the base station, an uplink grant to the at least one UE, wherein the uplink grant is transmitted on each subband of a third set of candidate subbands, the third set of candidate subbands including one or more of the second set of candidate subbands, and code to receive, by the base station, uplink transmissions from the at least one UE using a fourth set of candidate subbands, wherein the fourth set of candidate subbands includes one or more of the third set of candidate subbands.

In an additional aspect of the disclosure, a non-transitory computer-readable medium having program code recorded thereon. The program code further includes code to receive, by a UE, an uplink grant from a serving base station, wherein the uplink grant is received on each subband of a first set of candidate subbands, code to perform, by the UE, a CCA on the each subband of the first set of candidate subbands, code to determine, by the UE, a second set of candidate subbands including one or more subbands of the first set of candidate subbands for which the CCA is successful, code to transmit, by the UE, permitted uplink transmissions and a CCA outcome report on each subband of the second set of candidate subbands, wherein the permitted uplink transmissions were scheduled on a subband of the first set of candidate subbands corresponding to the each subband of the second set of candidate subbands and the CCA outcome report includes a CCA outcome for the CCA on the first set of candidate subbands, and code to withdraw, by the UE, non-permitted uplink transmissions scheduled for one or more subband of the first set of candidate subbands outside of the second set of candidate subbands.

In an additional aspect of the disclosure, a non-transitory computer-readable medium having program code recorded thereon. The program code further includes code to perform, by a base station, a CCA on each subband of a set of system allocated subbands, code to transmit, by the base station, an uplink grant to the at least one UE, wherein the uplink grant is transmitted on each subband of a first set of candidate subbands, the first set of candidate subbands including a plurality of subbands of the set of system allocated subbands for which the CCA is successful, code to receive, by the base station, uplink transmissions and a CCA outcome report from the at least one UE on each subband of a second set of candidate subbands, wherein the second set of candidate subbands includes one or more subbands of the first set of candidate subbands and the CCA outcome report includes a CCA outcome from the at least one UE for the first set of candidate subbands.

In an additional aspect of the disclosure, an apparatus configured for wireless communication is disclosed. The apparatus includes at least one processor, and a memory coupled to the processor. The processor is configured to receive, by a UE, an uplink grant and an identification of a first set of candidate subbands from a serving base station, wherein the identification includes a CCA trigger for the UE, to perform, by the UE, a CCA on each subband of the first set of candidate subbands, to determine, by the UE, a second set of candidate subbands including one or more subbands of the first set of candidate subbands for which the CCA is successful, and to prepare, by the UE, uplink transmissions in response to the second set of candidate subbands being a subset of the first set of candidate subbands.

In an additional aspect of the disclosure, an apparatus configured for wireless communication is disclosed. The apparatus includes at least one processor, and a memory coupled to the processor. The processor is configured to receive, by a UE, an uplink pre-grant signal from a serving base station, wherein the uplink pre-grant signal is received on each subband of a first set of candidate subbands, to perform, by the UE, a CCA on each subband of the first set of candidate subbands, to transmit, by the UE, a CCA success indicator to the serving base station, wherein the CCA success indicator is transmitted on each subband of a second set of candidate subbands, the second set of candidate subbands including one or more subbands of the first set of candidate subbands for which the CCA was successful, to receive, by the UE, an uplink grant from the serving base station, wherein the uplink grant is received on each subband of a third set of candidate subbands, the third set of candidate subbands including one or more of the second set of candidate subbands, and to transmit, by the UE, uplink transmissions to the serving base station using a fourth set of candidate subbands, wherein the fourth set of candidate subbands includes one or more of the third set of candidate subbands.

In an additional aspect of the disclosure, an apparatus configured for wireless communication is disclosed. The apparatus includes at least one processor, and a memory coupled to the processor. The processor is configured to perform, by a base station, a CCA on each subband of a set of system allocated subbands, to transmit, by the base station, an uplink pre-grant signal to the at least one UE, wherein the uplink pre-grant signal is transmitted on each subband of a first set of candidate subbands, the first set of candidate subbands including a plurality of subbands of the set of system allocated subbands for which the CCA is successful, to receive, by the base station, a CCA success indicator from the at least one UE, wherein the CCA success indicator is transmitted on each subband of a second set of candidate subbands, the second set of candidate subbands including one or more subbands of the first set of candidate subbands, to transmit, by the base station, an uplink grant to the at least one UE, wherein the uplink grant is transmitted on each subband of a third set of candidate subbands, the third set of candidate subbands including one or more of the second set of candidate subbands, and to receive, by the base station, uplink transmissions from the at least one UE using a fourth set of candidate subbands, wherein the fourth set of candidate subbands includes one or more of the third set of candidate subbands.

In an additional aspect of the disclosure, an apparatus configured for wireless communication is disclosed. The apparatus includes at least one processor, and a memory coupled to the processor. The processor is configured to receive, by a UE, an uplink grant from a serving base station, wherein the uplink grant is received on each subband of a first set of candidate subbands, to perform, by the UE, a CCA on the each subband of the first set of candidate subbands, to determine, by the UE, a second set of candidate subbands including one or more subbands of the first set of candidate subbands for which the CCA is successful, to transmit, by the UE, permitted uplink transmissions and a CCA outcome report on each subband of the second set of candidate subbands, wherein the permitted uplink transmissions were scheduled on a subband of the first set of candidate subbands corresponding to the each subband of the second set of candidate subbands and the CCA outcome report includes a CCA outcome for the CCA on the first set of candidate subbands, and to withdraw, by the UE, non-permitted uplink transmissions scheduled for one or more subband of the first set of candidate subbands outside of the second set of candidate subbands.

In an additional aspect of the disclosure, an apparatus configured for wireless communication is disclosed. The apparatus includes at least one processor, and a memory coupled to the processor. The processor is configured to perform, by a base station, a CCA on each subband of a set of system allocated subbands, to transmit, by the base station, an uplink grant to the at least one UE, wherein the uplink grant is transmitted on each subband of a first set of candidate subbands, the first set of candidate subbands including a plurality of subbands of the set of system allocated subbands for which the CCA is successful, to receive, by the base station, uplink transmissions and a CCA outcome report from the at least one UE on each subband of a second set of candidate subbands, wherein the second set of candidate subbands includes one or more subbands of the first set of candidate subbands and the CCA outcome report includes a CCA outcome from the at least one UE for the first set of candidate subbands.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 6 is a block diagram illustrating a portion of an NR unlicensed network with a base station and UE configured according to one aspect of the present disclosure.

DETAILED DESCRIPTION

Figure 1:
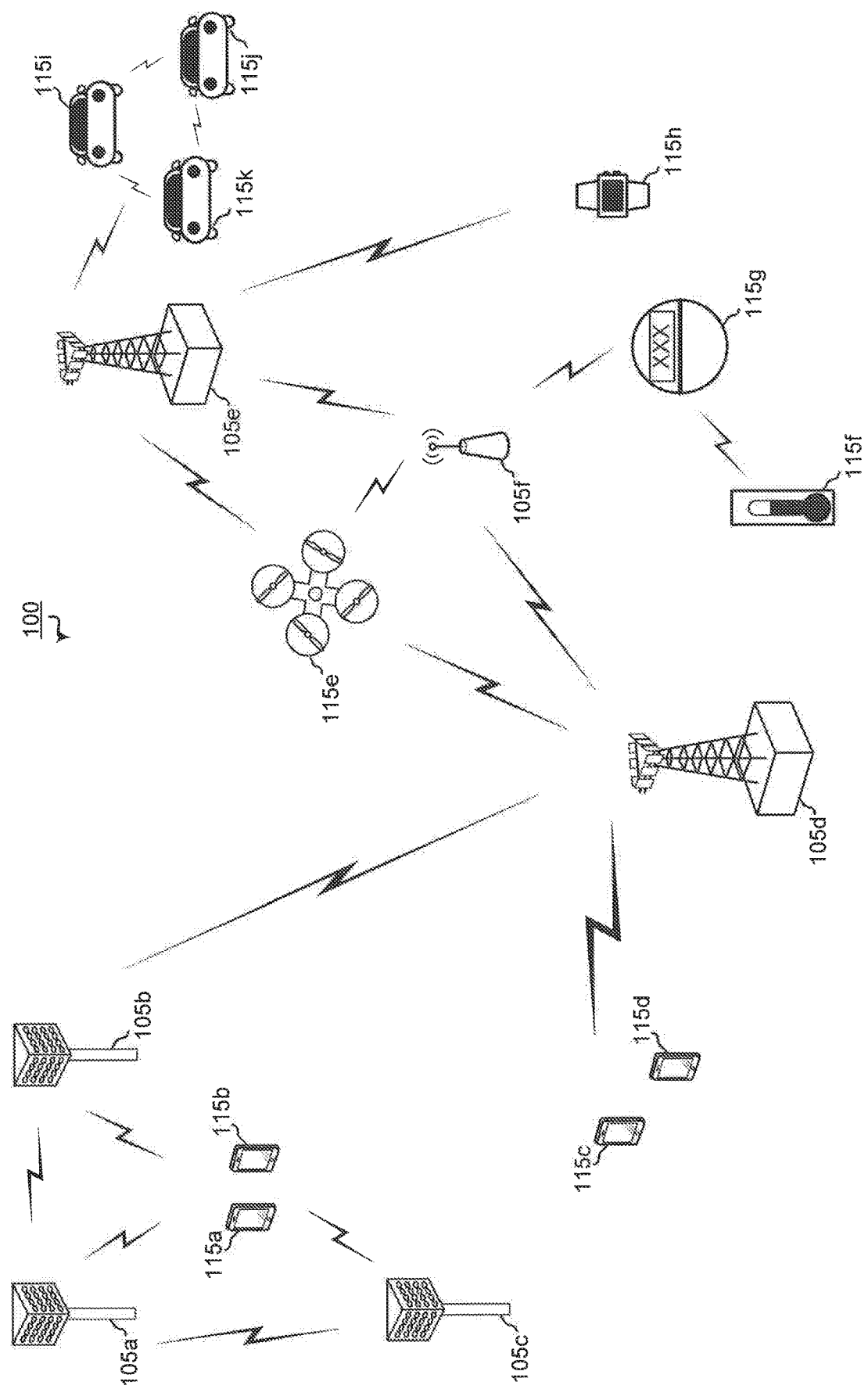
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like, UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/see), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mm Wave) transmissions, advanced channel coding, and device-centric mobility. Scalability of the numerology in 5G NR, with scaling subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mm Wave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) devices. UEs 115a-115d are examples of mobile smart phone-type devices accessing 5G network 100. A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
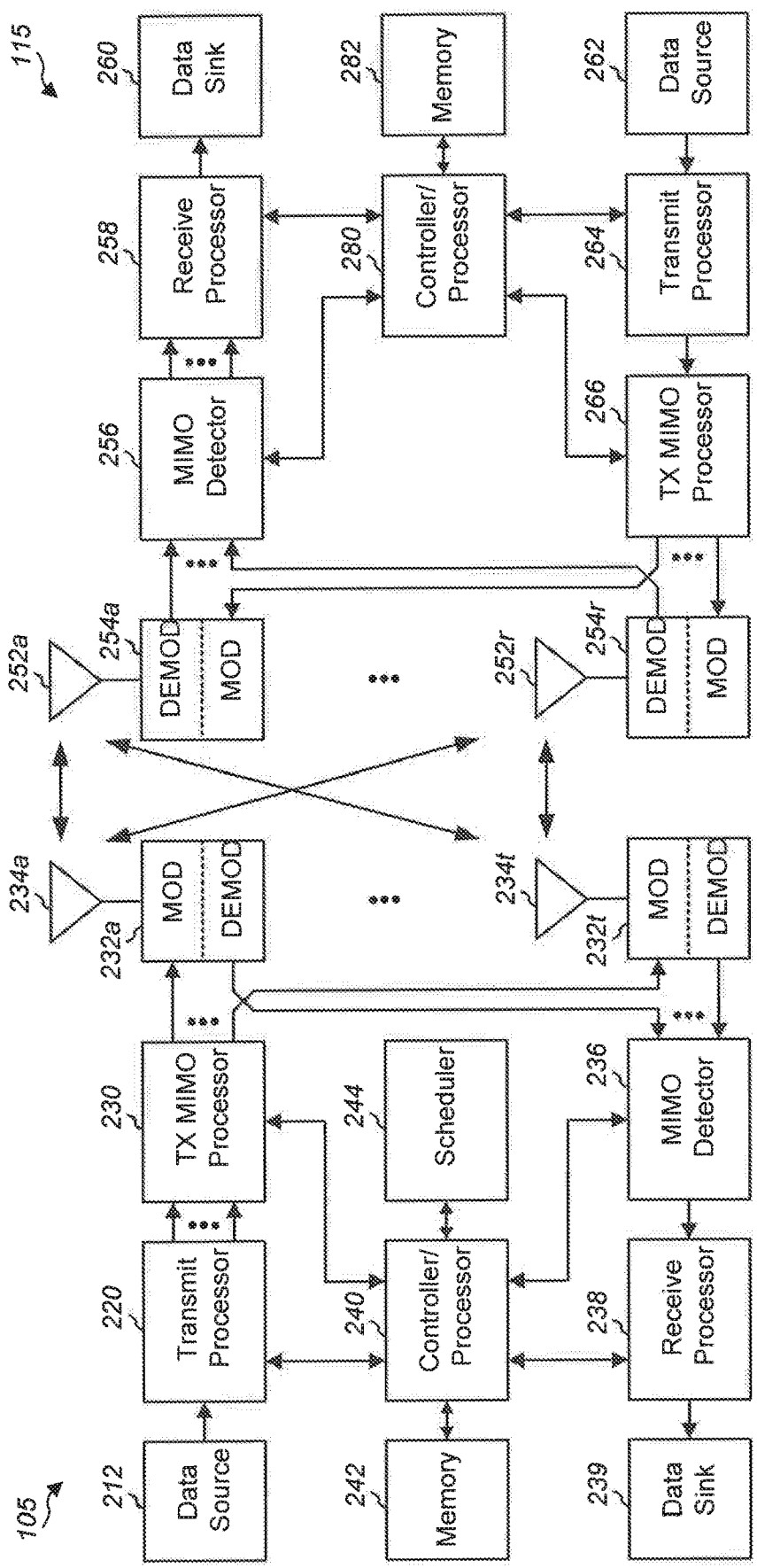
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively, Each demodulator 254 may condition (e.g., filter, amplify, downconvert, and digitize) a respective received signal to obtain input samples, Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 5, 7A, 7B, 9A, and 9B, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
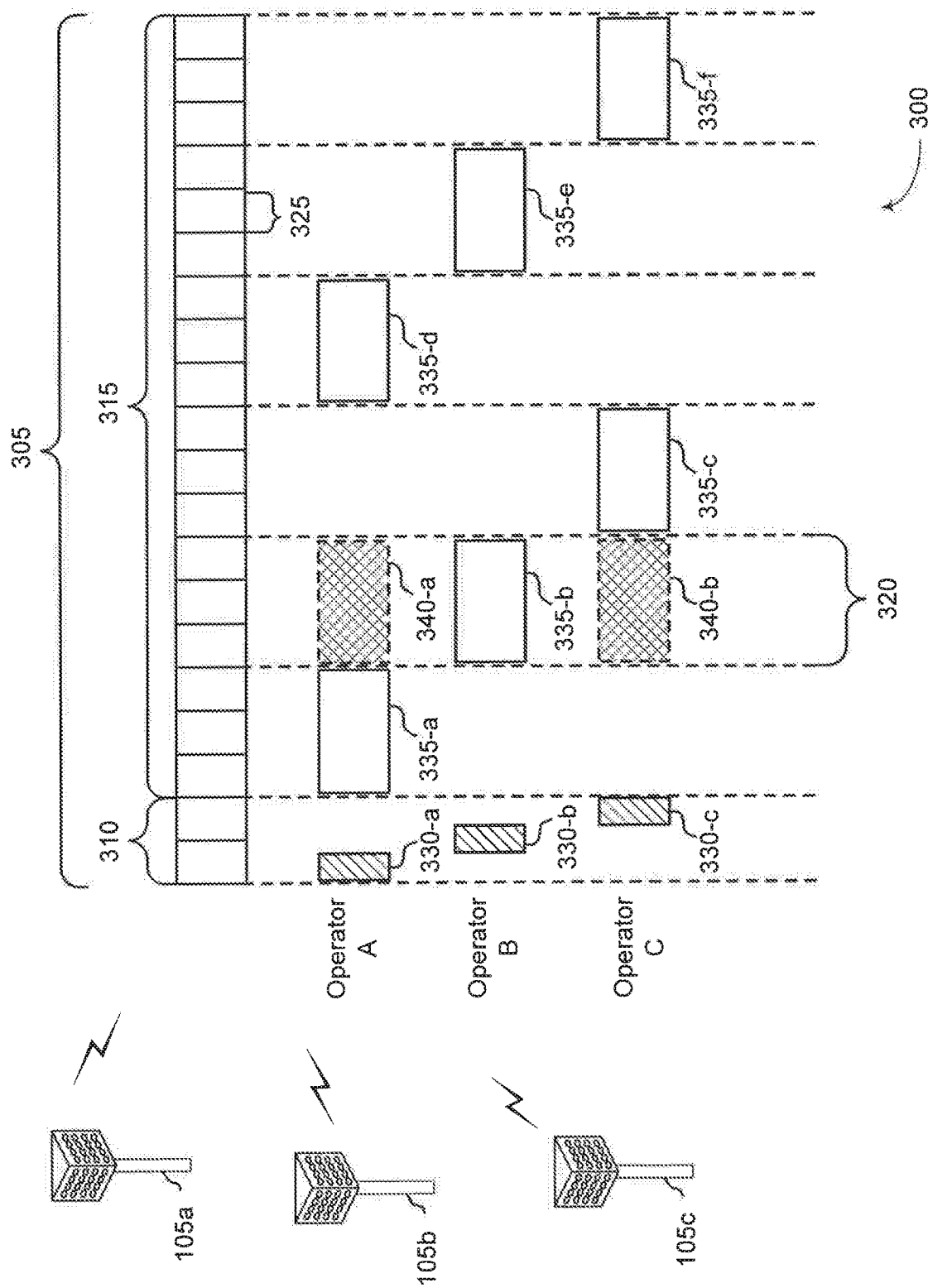
FIG. 3 is a block diagram illustrating a wireless communication system including base stations that use directional wireless beams.

FIG. 3 illustrates an example of a timing diagram 300 for coordinated resource partitioning. The timing diagram 300 includes a superframe 305, which may represent a fixed duration of time (e.g., 20 ms). Superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-*a*, even if Operator A chooses not to communicate during those resources. That is, access to exclusive resources is limited to the designated network operator. Similar restrictions apply to resources 330-*b* for Operator B and resources 330-*c* for Operator C. The wireless nodes of Operator A (e.g., UEs 115 or base stations 105) may communicate any information desired during their exclusive resources 330-*a*, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-*a* may be prioritized for use by Operator A and may therefore be referred to as a G-INT for Operator A (e.g., G-INT-OpA). Similarly, resources 335-*b* may be prioritized for Operator B, resources 335-*c* may be prioritized for Operator C, resources 335-*d* may be prioritized for Operator A, resources 335-*e* may be prioritized for Operator B, and resources 335-*f* may be prioritized for operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-*a* and resources 335-*b*), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-*a* without interference from the wireless nodes of Operator B or Operator C.

A network operating entity may additionally signal to another operator that it intends to use a particular G-INT. For example, referring to resources 335-*a*, Operator A may signal to Operator B and Operator C that it intends to use resources 335-*a*. Such signaling may be referred to as an activity indication. Moreover, since Operator A has priority over resources 335-*a*, Operator A may be considered as a higher priority operator than both Operator B and Operator C. However, as discussed above, Operator A does not have to send signaling to the other network operating entities to ensure interference-free transmission during resources 335-*a* because the resources 335-*a* are assigned with priority to Operator A.

Similarly, a network operating entity may signal to another network operating entity that it intends not to use a particular G-INT. This signaling may also be referred to as an activity indication. For example, referring to resources 335-*b*, Operator B may signal to Operator A and Operator C that it intends not to use the resources 335-*b* for communication, even though the resources are assigned with priority to Operator B. With reference to resources 335-*b*, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-*b* may be considered an opportunistic interval (O-INT) for Operator A (e.g., O-INT-OpA). For illustrative purposes, resources 340-*a* may represent the O-INT for Operator A. Also, from the perspective of Operator C, the same sub-interval 320 may represent an O-INT for Operator C with corresponding resources 340-*b*. Resources 340-*a*, 335-*b*, and 340-*b* all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-*b* (e.g., G-INT-OpB), then Operator A may use those same resources (e.g., represented by resources 340-*a*) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-*b*) in response to an indication that Operator B was not going to use its G-INT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-μs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with a uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-μs transmission opportunity.

Although three operators are illustrated in FIG. 3, it should be understood that fewer or more network operating entities may be configured to operate in a coordinated manner as described above. In some cases, the location of the G-INT, O-INT, or A-INT within superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

Within the 5G systems, the LBT procedure may be used to sense channel use prior to transmitting on a shared communication channel. In general, an LBT procedure provides for the transmitting node to perform a CCA check to evaluate the presence or absence of other signals on the shared channel. Such CCA checks may use at least an energy detection process to determine if interference detected on the shared channel rises to a level to be considered an actual signal using the channel. Four categories of LBT procedure have been discussed for use in 5G systems. The first category of LBT (Cat-1) provides no LBT at all. In such Cat-1 LBT circumstances, the transmitter would simply begin to transmit. The second category of LBT (Cat-2) provides for performing an LBT, such as through a CCA, only without a random back-off or contention window. Such, shortened Cat-2 LBTs result in a quick check of the channel prior to beginning transmissions. The Cat-2 LBT may also be referred to as the 25 μs LBT. The third category of LBT (Cat-3) provides for performing an LBT procedure with both a random hack-off value and a fixed contention window. The fourth category of LBT (Cat-4) provides for performing an LBT procedure with both a random back-off value and a variable contention window. In both Cat-3 and Cat-4 LBT, the transmitter selects a random number for the back-off value and performs the LBT or CCA check when the random back-off has passed. However, in Cat-3 the contention window size is fixed, while it is variable in Cat-4.

In an NR unlicensed deployment for the sub-6 GHz band, incumbent operations include WiFi, license assisted access (LAA), and MulteFire. Access to communications in an NR unlicensed deployment may occur via multiple subbands. For example, the system bandwidth may be divided into multiple subband units having the same timing relationship and duplex modes between subbands (e.g., 20 MHz/subband, 15 MHz/subband, etc.). Each network node may transmit on one or more of the subbands after performing an LBT procedure. A base station will initiate its own LBT prior to transmitting on the shared channel, while a UE LBT procedure may be triggered dynamically by a base station, or may be configured semi-persistently.

Figure 4:
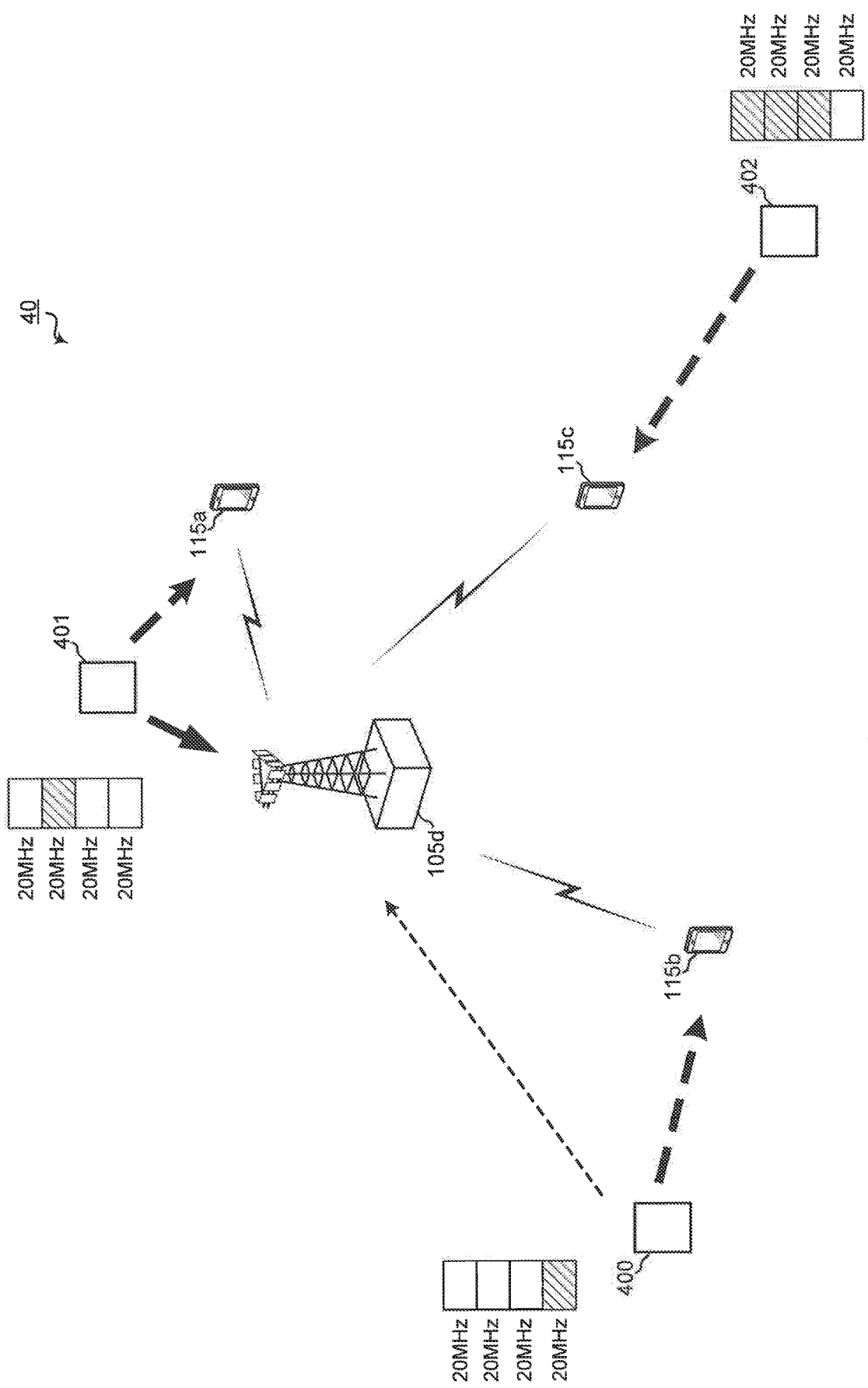
FIG. 4 is a block diagram illustrating NR unlicensed network.

FIG. 4 is a block diagram illustrating NR unlicensed network 40. For UEs 115a-115c to conduct uplink communications, uplink grants will be provided by the serving base station, base station 105d. Base stations, such as base station 105d, and UEs, such as UEs 115a-115c, both use LBT procedures prior to transmitting on the shared communication channel. The LBT procedure, such as a CCA, is performed per subband. In one example implementation for a 50 Hz band, a typical subband bandwidth may be 20 MHz. One of the challenges for multi-band uplink transmissions is that the interference profile observed by a base station may differ from those of its served UEs. The differing interference profiles may arise based on the base station and UE adopting different LBT schemes (e.g., energy detection based vs. preamble detection based) and/or using different CCA thresholds. A trade off exists in UE LBT between reliability and efficiency of uplink transmissions with signaling overhead and power consumption. For example, a UE may adopt an energy detection LBT to reduce the complexity and overhead that would be present with a preamble detection LBT The resulting signaling overhead and power consumption may be more favorable to the UE, while the uplink transmission reliability and efficiency may be less. Because the base stations would not typically have overhead and power considerations, they may perform preamble detection, which increases the complexity and overhead, but yields a more reliable and efficient transmission. Thus, the interference environment at base station 105*d* and UEs 115*a*-115*c* are potentially different.

As illustrated in NR unlicensed network 40, base station 105*d* serves UEs 115*a*-115*c* with access provided to the shared communications channel via four 20 MHz subbands. The LBT scheme and location of different interfering nodes may cause the LBT results for base station 105*d* to be different from the LBT results of UEs 115*a*-115*c*. For example, network node 401 provides strong interference to both base station 105*d* and UE 115*a*, but only on one of the 20 MHz subbands. Thus, a CCA performed by both base station 105*d* and UE 115*a* for uplink communication from UE 115*a* may have the same results. Network node 402 provides strong interference, but only to UE 115*c* over 60 MHz. Base station 105*d* is unlikely to detect interference from network node 402. Thus, a CCA performed by both base station 105*d* and UE 115*c* may have conflicting results, as UE 115*c* would see the strong interference on the 60 MHz from network node 402. Network node 400 provides strong interference at UE 115*b* over 20 MHz, but only provides weak interference at base station 105*d*. Accordingly, the CCA performed by base station 105*d* may potentially be different from the CCA performed by UE 115*b*.

Base station 105*d* would not know the CCA outcomes of UEs 115*a*-115*c* ahead of time. An issue may arise as to how base station 105*d* can schedule the uplink grants of UEs 115*a*-115*c* without knowing the CCA outcomes. Similarly, an issue may arise when an uplink grant from base station 105*d* is mismatched with the available time and location determined by the CCA outcomes of UEs 115*a*-115*c* Various aspects of the present disclosure are directed to managing uplink access in a multi-band NR-SS system.

Figure 5:
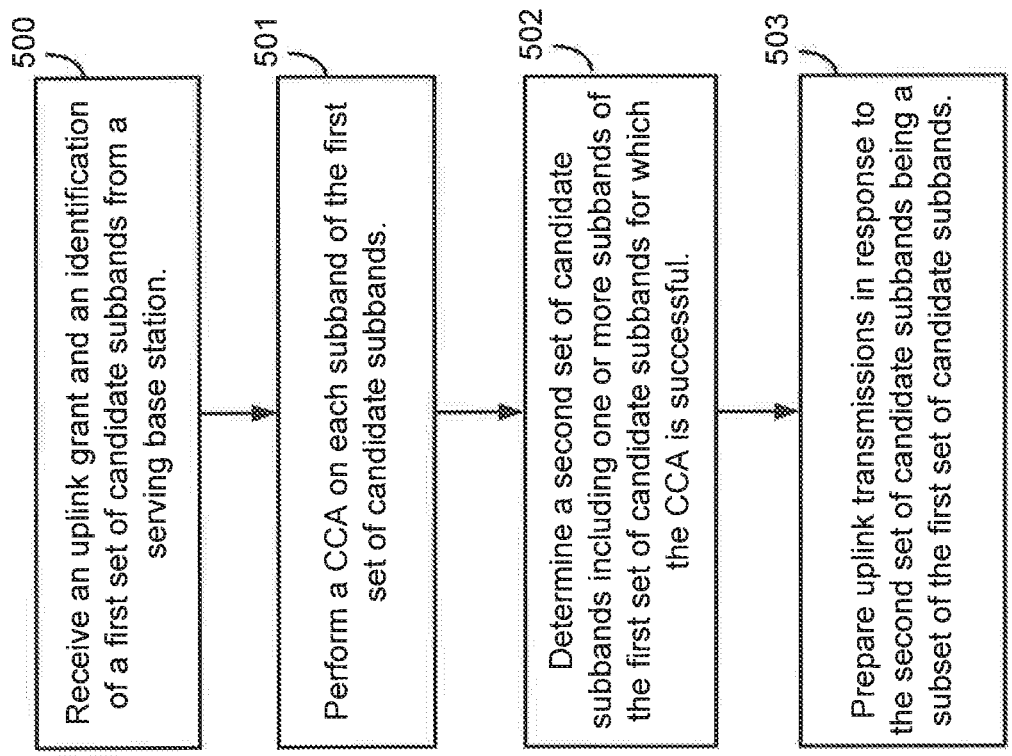
FIG. 5 is a block diagram illustrating example blocks executed to implement one aspect of the present disclosure.
Figure 11:
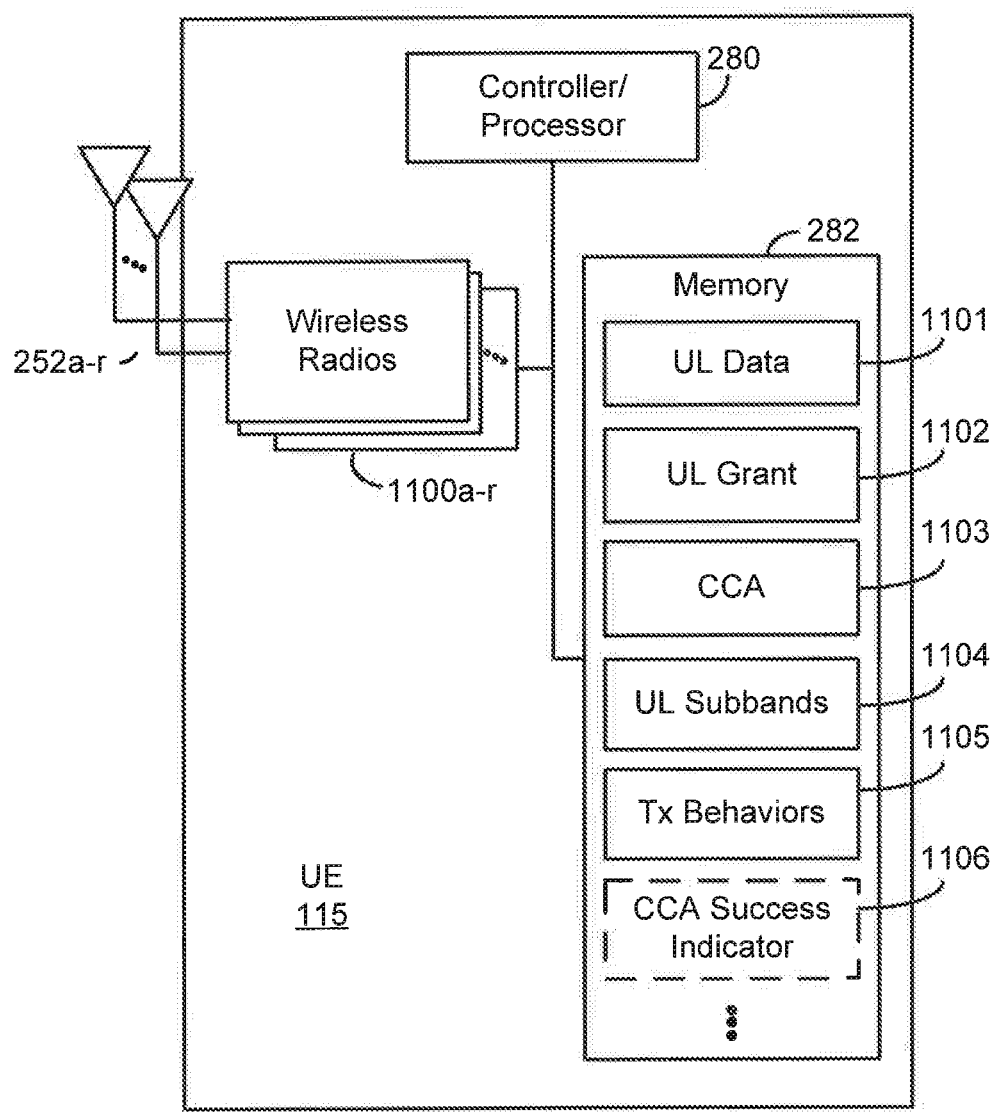
FIG. 11 is a block diagram illustrating a UE configured according to aspects of the present disclosure.

FIG. 5 is a block diagram illustrating example blocks executed to implement one aspect of the present disclosure. The example blocks will also be described with respect to UE 115 as illustrated in FIG. 11. FIG. 11 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1100*a*-*r* and antennas 252*a*-*r*. Wireless radios 1100*a*-*r* includes various components and hardware, as illustrated in FIG. 2 for UE 115, including modulator/demodulators 254*a*-*r*, MIMO detector 256, receive processor 258, transmit processor 264, and TX MIMO processor 266.

At block 500, a UE receives an uplink grant and an identification of a first set of candidate subbands from a serving base station, wherein the identification includes a CCA trigger for the UE. For example, UE 115 receives the uplink grant for transmissions of uplink data 1101 and subband identification via antennas 252*a*-*r* and wireless radios 1100*a*-*r*. The uplink grant details are stored at UL grant 1101 and the subband identification is stored at UL subbands 1104, in memory 282 The serving base station performs a CCA on each subband of the available bandwidth. The serving base station selects each of the subbands of the available bandwidth having a successful CCA result for the first set of candidate subbands identified to the UE.

Upon detection of CCA result information from the base station, the UE can conserve power by de-activating the subbands corresponding to the system-allocated subbands for which the CCA failed. The de-activated subbands will not be used for downlink reception or uplink transmission. For the purpose of interference management, some subbands can be dynamically de-activated even though they pass CCA, for example, in order to implement interference coordination measures with neighboring cells. Re-activation or wake-up signals can be carried by PDCCH/EPDCCH when the subbands become available for potential communications again.

At block 501, the UE performs a CCA on each subband of the first set of candidate subbands. The uplink grant received from the base station includes the CCA trigger. UE 115, under control of controller/processor 280, executes CCA logic 1103, in memory 282, The execution environment of CCA logic 1103 provides for UE 115 to perform the CCA on each of the first set of candidate subbands on receipt of the trigger.

At block 502, the UE determines a second set of candidate subbands including one or more subbands of the first set of candidate subbands for which the CCA is successful. UE 115, under control of controller processor 280, selects each of the subbands of the first set of candidate subbands having a successful CCA result for the second set of candidate subbands and stores the refined subbands of the second set to UL subbands 1104.

At block 503, the UE prepares uplink transmissions in response to the second set of candidate subbands being a subset of the first set of candidate subbands. As previously noted, the CCA results of UE 115 may not match the CCA results of the base station. Thus, when the second set of candidate subbands does not match the first set of candidate subbands, UE 115 prepares its uplink transmissions according to multiple optional behaviors. In preparation for uplink transmissions, UE 115, under control of controller/processor 280, executes transmission behaviors logic 1105. The execution environment of transmission behaviors logic 1105 causes UE 115 to select the transmission behavior for the uplink transmissions according to the optional behaviors described herein. For example, in a first optional behavior, UE 115 will drop the uplink transmission completely. Thus, then UE 115 detects a mismatch between the first and second sets of candidate subbands, UE 115 will drop the PUSCH.

In a second optional behavior, when UE 115 detects the mismatch, UE 115 continues the uplink transmission by puncturing the remaining subbands. The uplink transmission are scheduled according to the first set of candidate subbands. However, when the second set of candidate subbands does not include one or more subband of the first set, the uplink transmission will be punctured by dropping the uplink transmission packets scheduled for those subbands. UE 115 would transmit the remaining part of the PUSCH in the remaining subbands of the second set of candidate subbands via wireless radios 1100*a*-*r* and antennas 252*a*-*r*.

In a third optional behavior, as UE 115 detects the mismatch, UE 115 transmits PUSCH using the original transport block size (TBS) in the remaining subbands with rate matching. For the rate matching, UE 115 may select a different MCS in order to reduce subband area to fit in the available subbands. UE 115 will drop the packets that do not fit within the remaining rate-matched subbands. In each of these three options, the resulting transmission loses all or some portion of the uplink transmission.

In a fourth optional behavior, when UE 115 detects the mismatch, UE 115 transmits PUSCH with a scaled TBS in the remaining subbands via wireless radios 1100*a*-*r* and antennas 252*a*-*r*. For example, the execution environment of transmission behaviors 1105 allows UE 115 to shorten the TBS in order to fit all of the uplink data packets into the remaining subbands. Thus, in the fourth optional behavior, UE 115 may preserve the entire uplink data packet within the remaining subbands.

It should be noted that, in each of the optional behaviors in which UE 115 changes an aspect of the uplink grant, UE 115 would signal what this change is to the serving base station so that it may reliably receive and decode the uplink data. For example, UE 115 may use PUCCH to communicate the changed uplink grant. Alternatively, an additional field may be defined within the uplink control information (UCI) message that identifies the change to the uplink grant.

FIG. 6 is a block diagram illustrating a portion of NR unlicensed network 60 with base station 105*a* and UE 115*d* configured according to one aspect of the present disclosure. The network operating environment of NR unlicensed network 60 includes a set of allocated subbands of shared communication spectrum available for communication between base station 105*a* and UE 115*d*. Prior to transmissions on the shared communication spectrum, base station 105*a* performs a CCA on all of the subbands of the set of allocated subbands. Base station 105*a* will identify a first set of candidate subbands from each of the allocated subbands for which the CCA is detected as successful. In preparation for uplink scheduling, base station 105*a* transmits an uplink grant to UE 115*d* that includes an LBT trigger that identifies the subbands of the first set of candidate subbands.

Upon receiving the uplink grant with the LBT trigger from base station 105*a*, UE 115*d* performs a CCA on each of the subbands of the first set of candidate subbands. Network node 600 is located in a position in which its transmissions cause substantial interference to UE 115*d* at several of the subband frequencies. Because of its position and transmit power, network node 600 is unseen by base station 105*a*. Thus, the results of the CCA by UE 115*d* is different from the CCA results of base station 105*a* revealed by the first set of candidate subbands. The subbands of the first set with a successful CCA by UE 115*d* are identified as a second set of candidate subbands. Upon UE 115*d* detecting the difference between the first and second sets of candidate subbands, UE 115*d* prepares its uplink transmissions according to one of the four optional behaviors, as discussed with respect to FIG. 5. For example, UE 115*d* may completely drop its uplink transmission for this uplink transmission slot. Alternatively, UE 115*d* may also transmit a portion its uplink data by puncturing in the remaining subbands. UE 115*d* may further alternatively either transmit a portion of the uplink data by rate matching in the remaining subbands or transmit all of the uplink data by modifying the TBS to fit all of the uplink data in the remaining subbands. UE 115*d* would signal to base station 105*a* how it changed the parameters of the original uplink grant (e.g., modified MCS, TBS, etc.), in order for base station 105*a* to reliably receive and decode the uplink transmission.

Figures 7A, 7B:
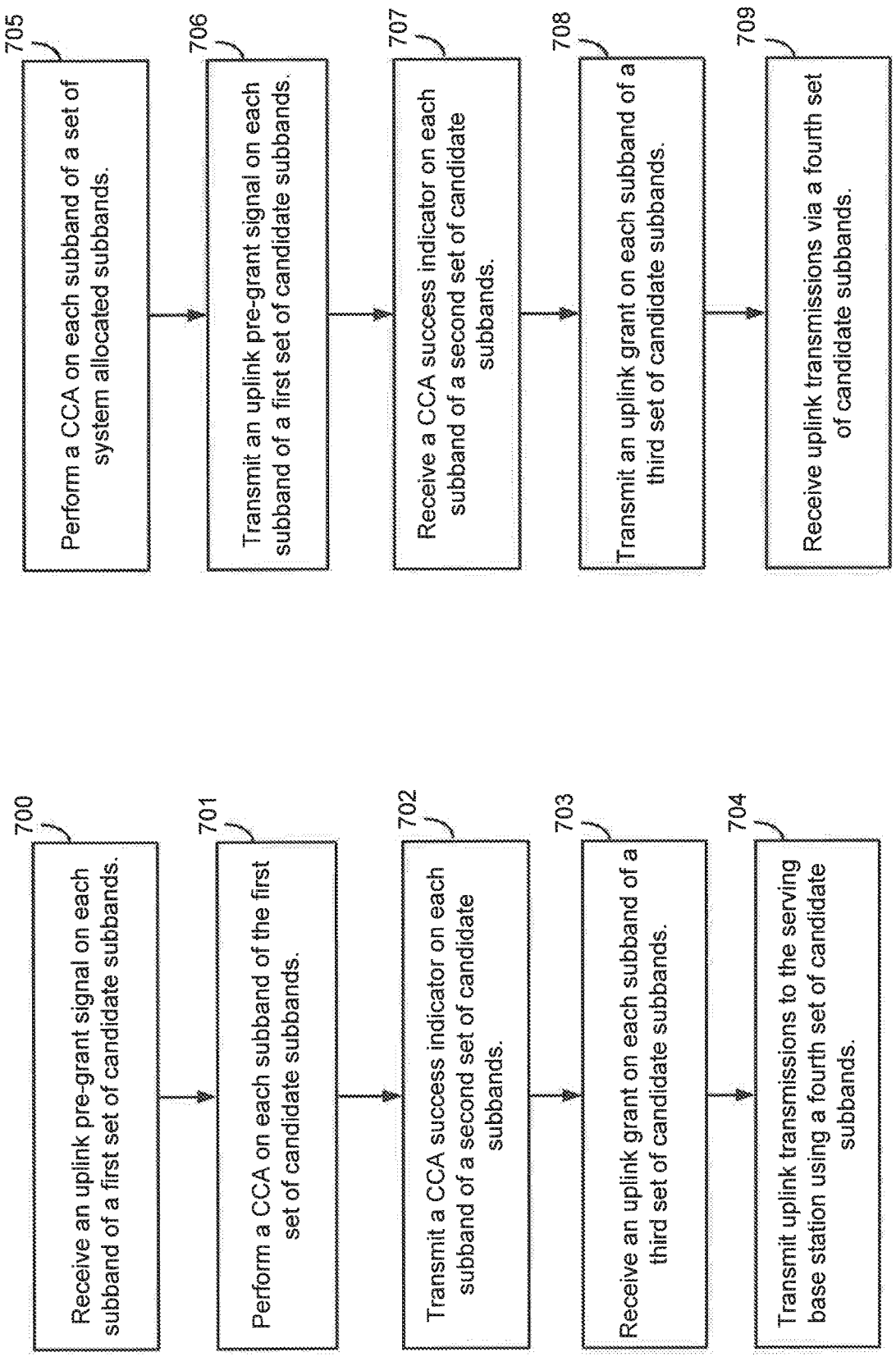
FIGS. 7A and 7B are block diagrams illustrating example blocks executed to implement one aspect of the present disclosure.

FIG. 7A is a block diagram illustrating example blocks executed to implement one aspect of the present disclosure. The example blocks will also be described with respect to UE 115 as illustrated in FIG. 11.

At block 700, a UE receives an uplink pre-grant signal from a serving base station, wherein the uplink pre-grant signal is received on each subband of a first set of candidate subbands. UE 115 receives the pre-grant signal on each of the first set of candidate subbands via antennas 252*a-r* and wireless radios 1100*a-r*. The pre-grant details, including the identification of the first set of candidate subbands, are stored at UL subbands 1104, in memory 282 The serving base station performs a CCA on each subband of the available bandwidth allocated by the network. The serving base station selects each of the subbands of the available bandwidth having a successful CCA result for the first set of candidate subbands identified to the UE. Instead of a full uplink grant, the serving base station first transmits a pre-grant signal to the UE with identification of the first set of candidate subbands. The pre-grant signal is transmitted on each of the candidate subbands of the first set As noted above, upon detection of CCA result information from the base station, the UE can conserve power by de-activating the subbands corresponding to the system-allocated subbands for which the CCA failed or de-activated dynamically to implement interference coordination measures with neighboring cells.

At block 701, the UP performs a CCA on each subband of the first set of candidate subbands. The uplink pre-grant signal received from the base station identifies the first set of candidate subbands for potential uplink transmission. The pre-grant signal may include an LBT trigger or, alternatively, the UE may be semi-persistently scheduled to perform its LBT procedure. A UE-specific pre-grant LBT trigger may be carried via PDCCH/PDCCH, Once the pre-grant has been received, UE 115, under control of controller/processor 280, executes CCA logic 1103, in memory 282. The execution environment of CCA logic 1103 provides for UE 115 to perform the CCA on each of the first set of candidate subbands. The CCA will be performed either based on a trigger mechanism received from the base station or according to its semi-persistent configuration. UE 115 selects each of the subbands of the first set of candidate subbands having a successful CCA result for the second set of candidate subbands and stores the refined subbands of the second set to UL subbands 1104.

At block 702, the UE transmits a CCA success indicator to the serving base station, wherein the CCA success indicator is transmitted on each subband of a second set of candidate subbands, the second set of candidate subbands including one or more subbands of the first set of candidate subbands for which the CCA was successful. UE 115 selects each of the subbands of the first set of candidate subbands having a successful CCA result for the second set of candidate subbands. UE 115 will transmit CCA success indicator 1106, from memory 282, which identifies the CCA results to the serving base station by transmitting CCA success indicator 1106 on each corresponding subband of the determined second set of candidate subbands. This response to the pre-grant received from the serving base station may be transmitted in a reconfigured SRS.

At block 703, the UE receives an uplink grant from the serving base station, wherein the uplink grant is received on each subband of a third set of candidate subbands, the third set of candidate subbands including one or more of the second set of candidate subbands. As the serving base station receives the CCA success indicator on each of the subbands of the second set of candidate subbands, the serving base station may further refine the subband allocation for potential uplink transmission by UE 115. For example, UE 115 receives the uplink grant for transmissions of uplink data 1101 and refined subband identification via antennas 252*a-r* and wireless radios 1100*a-r*. The uplink grant details are stored at UL grant 1101 and the subband identification is stored at UL subbands 1104, in memory 282

At block 704, the UE transmits uplink transmissions to the serving base station using a fourth set of candidate subbands, wherein the fourth set of candidate subbands includes one or more of the third set of candidate subbands. UE 115 receives the full uplink grant and identification of the third set of candidate subbands that have been refined using CCA results from both the serving base station and the UE, and potentially with interference coordination by the base station. Prior to beginning the uplink transmissions, though, UE 115 may further refine the available subbands for example by performing an additional single-shot LBT (e.g., Cat-2 LBT) using CCA logic 1103, or by determining channel quality using signals transmitted along with the uplink grant (e.g., CSI-RS, DMRS, etc.), Based on the further refinement, the final set of subbands that UE 115 uses for uplink transmission may be different from the last candidate set received from the serving base station in the uplink grant.

Figure 12:
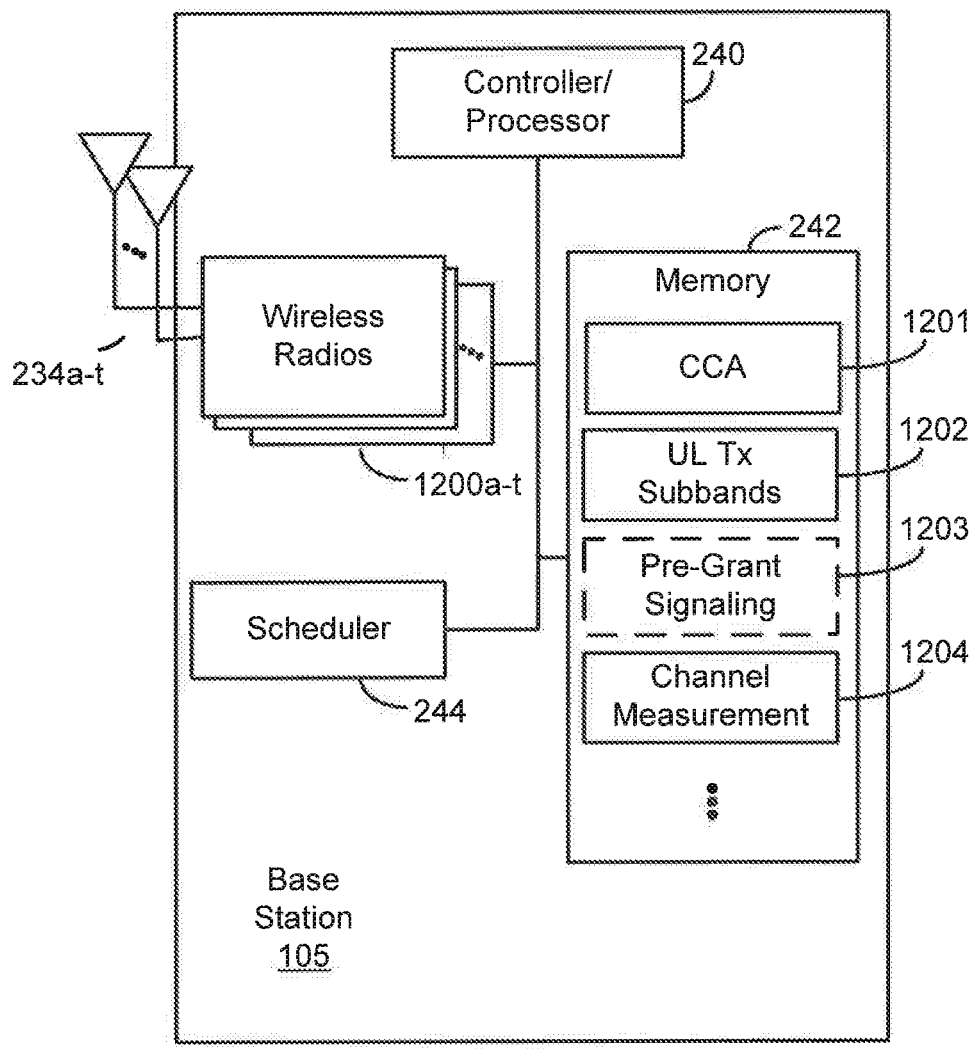
FIG. 12 is a block diagram illustrating a base station configured according to aspects of the present disclosure.

FIG. 7B is a block diagram illustrating example blocks executed to implement one aspect of the present disclosure. The example blocks will also be described with respect to base station 105 as illustrated in FIG. 12. FIG. 12 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 1200a-t and antennas 234a-t. Wireless radios 1200a-t includes various components and hardware, as illustrated in FIG. 2 for base station 105, including modulator/demodulators 232a-t, MIMO detector 236, receive processor 238, transmit processor 220, and TX MIMO processor 230.

At block 705, a base station performs a CCA on each subband of a set of system allocated subbands. As noted, base station 105, under control of controller/processor 240, executes CCA logic 1201, stored in memory 242. The execution environment of CCA logic 1201 provides for base station 105 to perform a CCA on each subband of the available bandwidth allocated by the network and selects each of the subbands of the available bandwidth having a successful CCA result for the first set of candidate subbands. The selected first set of candidate subbands for the served UE will be stored at UT transmission subbands 1202 in memory 242.

At block 706, the base station transmits an uplink pre-grant signal to the at least one UE, wherein the uplink pre-grant signal is transmitted on each subband of a first set of candidate subbands, the first set of candidate subbands including a plurality of subbands of the set of system allocated subbands for which the CCA is successful. Base station 105, under control of controller/processor 240, executes pre-grant signaling logic 1203. The execution environment of pre-grant signaling logic 1203 provides for a pre-grant signal to be generated by base station 105. The uplink pre-grant signal transmitted by base station 105 via wireless radios 1200a-t and antennas 234a-t identifies the first set of candidate subbands for potential uplink transmission. The pre-grant signal may also include an LBT trigger or, alternatively, the UE may be semi-persistently scheduled to perform its LBT procedure.

At block 707, the base station receives a CCA success indicator from the at least one UE, wherein the CCA success indicator is transmitted on each subband of a second set of candidate subbands, the second set of candidate subbands including one or more subbands of the first set of candidate subbands. In response to the pre-grant signal, base station 105 receives the CCA success indicator via antennas 234a-t and wireless radios 1200a-t on a corresponding subband having a successful CCA by the UE. The CCA success indicator may allow base station 105 to update or refine the selected subbands stored at UL transmission subframes 1202.

At block 708, the base station transmits an uplink grant to the at least one UE, wherein the uplink grant is transmitted on each subband of a third set of candidate subbands, the third set of candidate subbands including one or more of the second set of candidate subbands. As base station 105 receives the CCA success indicator on each of the subbands of the second set of candidate subbands, base station 105 may further refine the subband allocation for potential uplink transmission by the UE. Base station 105 generates the uplink grant via scheduler 244, under control of controller/processor 240, identifying a third set of candidate subbands. The third set of candidate subbands may be different than the subbands of the second set received from the UE. The difference may be due to additional information determined or obtained by base station 105. For example, using signals received by base station 105 from the UE in addition to the CCA success indicator (e.g., CSI, SRS, etc.), base station 105 may determine channel quality measurements for some of the subbands of the second set that may not be desirable for communications. Base station 105 may execute channel measurement logic 1204, stored in memory 242. The execution environment of channel measurement logic 1204, allows base station 105 to determine the channel quality of the current set of subbands in order to further refine the set of candidate subbands. Alternatively, base station 105 may be operating in coordination with neighboring cells to reduce interference. In such case, base station 105 may, under control of controller/processor 240, refrain from using certain subbands in the uplink grant in order to further the coordinated interference reduction. Thus, after receiving the refined second set of candidate subbands from the UE, base station 105 may further refine the candidate subbands for the uplink communications. Base station 105 transmits the full uplink grant using the further refined third set of candidate subbands.

At block 709, the base station receives uplink transmissions from the at least one UE using a fourth set of candidate subbands, wherein the fourth set of candidate subbands includes one or more of the third set of candidate subbands. Prior to beginning its uplink transmissions, the UE may further refine the available subbands, as noted, by an additional single-shot LBT or by determining channel quality using signals transmitted along with the uplink grant. Based on this further refinement, the uplink transmission from the UE will be received by base station 105 on the final set of subbands via antennas 234a-t and wireless radios 1200a-t that may be different from the last candidate set transmitted by base station 105 in the uplink grant.

In the aspect illustrated in FIGS. 7A and 7B, the base station and UE exchange information about their respective subband based CCA outcomes. The pre-grant handshaking may occur in the preparation stage of a transmission opportunity. Before regular downlink/uplink transmissions are actually granted, both the base station and UE agree on the available subbands for opportunistic access. In addition to downlink/uplink scheduling decisions, PDCCH/EPDCCH can also carry the pre-grant to trigger a UE-specific LBT. As noted, in addition to the channel sounding functionality, SRS can be configured as the signal from the UE in response to the pre-grant.

Figure 8:
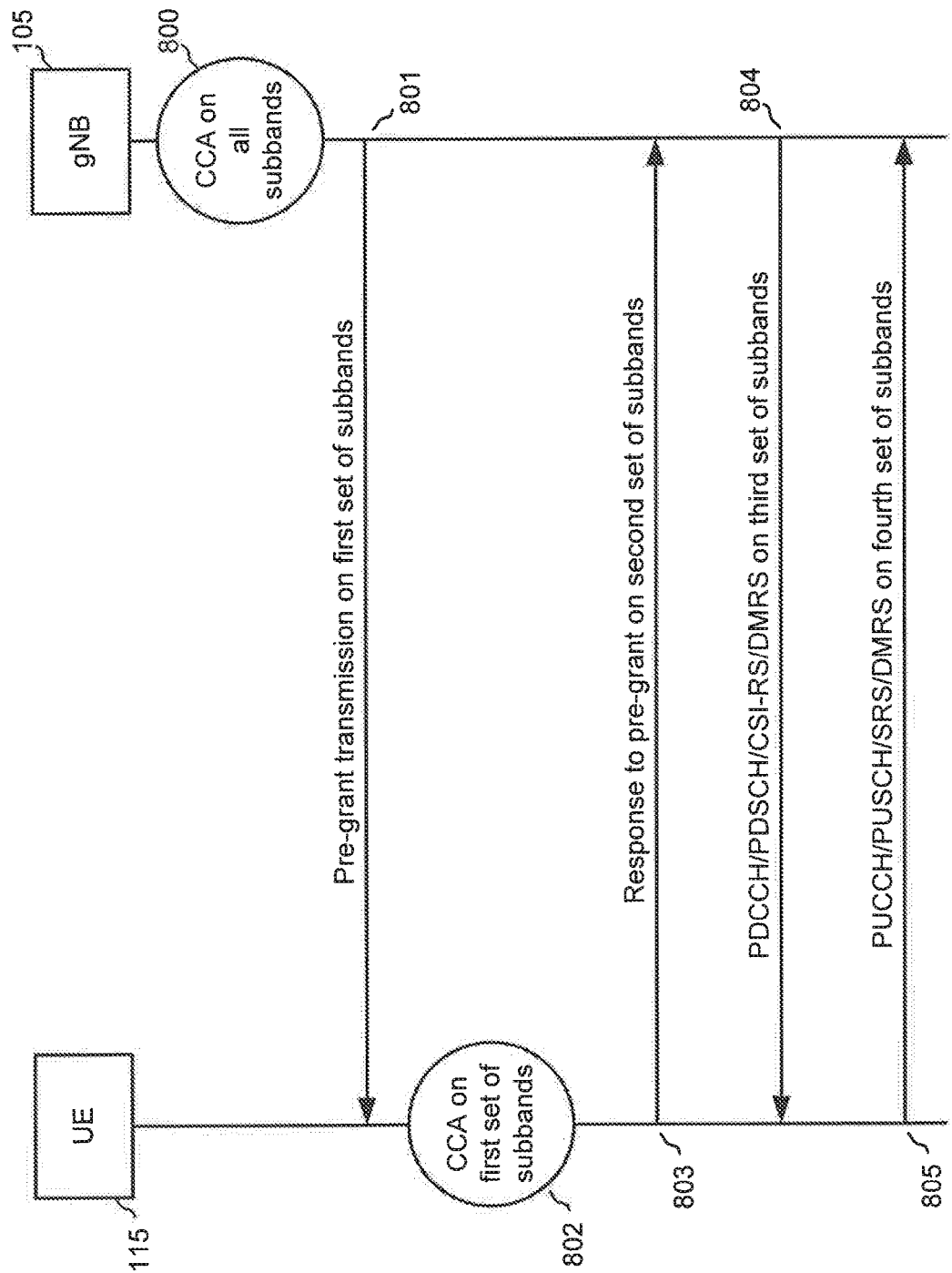
FIG. 8 is a communication flow diagram between a base station and a UE configured according to one aspect of the present disclosure.

FIG. 8 is a communication flow diagram between a base station 105 and a UE 115 configured according to one aspect of the present disclosure. Base station 105 conducts an LBT across each allocated subband during an LBT window at 800. At 801, base station 105 transmits a pre-grant using the CCA cleared subbands (first set of candidate subbands). A pre-grant signal can be a unicast signal specifically targeting UE 115 for scheduling. In certain aspects, the pre-grant signal can be carried by PDCCH/EPDCCH. A downlink control information (DCI) of the pre-grant signal may include random access (RA) information for UE 115's CCA outcomes, SRS configuration, and the like. UE 115 searches for the pre-grant signal from base station 105 and performs LBT at 802. The LBT by UE 115 may be triggered by the pre-grant signal, or may be semi-persistently scheduled, When a subband is blocked by interferers (local to UE 115), the CCA on that subband is unsuccessful and the pre-grant on the subband may be lost.

At 803, UE 115's CCA outcome is sent on the selected subbands that had a successful CCA (second set of candidate subbands). The acknowledgement signal responding to the pre-grant signal can be carried by SRS/PUCCII/PUSCH. At 804, using the refined subband information from UE 115, base station 105 schedules the uplink/downlink transmission. The ensuing control/data transmission occurs on selected subbands (third set of candidate subbands) after further refinement by base station 115. The scheduling decisions at 804 by base station 115 resulting in the third set of candidate subbands may leverage the channel sounding results of SRS obtained as pre-grant response or may leverage interference coordination with neighboring cells. At 805, UE 115 transmits the uplink control/data/RS on selected sub-bands (fourth set of subbands). UE 115 may still further refine the subband selection by performing further LBT procedures or calculating channel quality information based on signals received from base station 105 at 804 (e.g., CSI-RS, DMRS, etc.). The further refinement may result in the fourth set of subbands being a subset of the third set of candidate subbands received from base station 105.

Figure 9A:
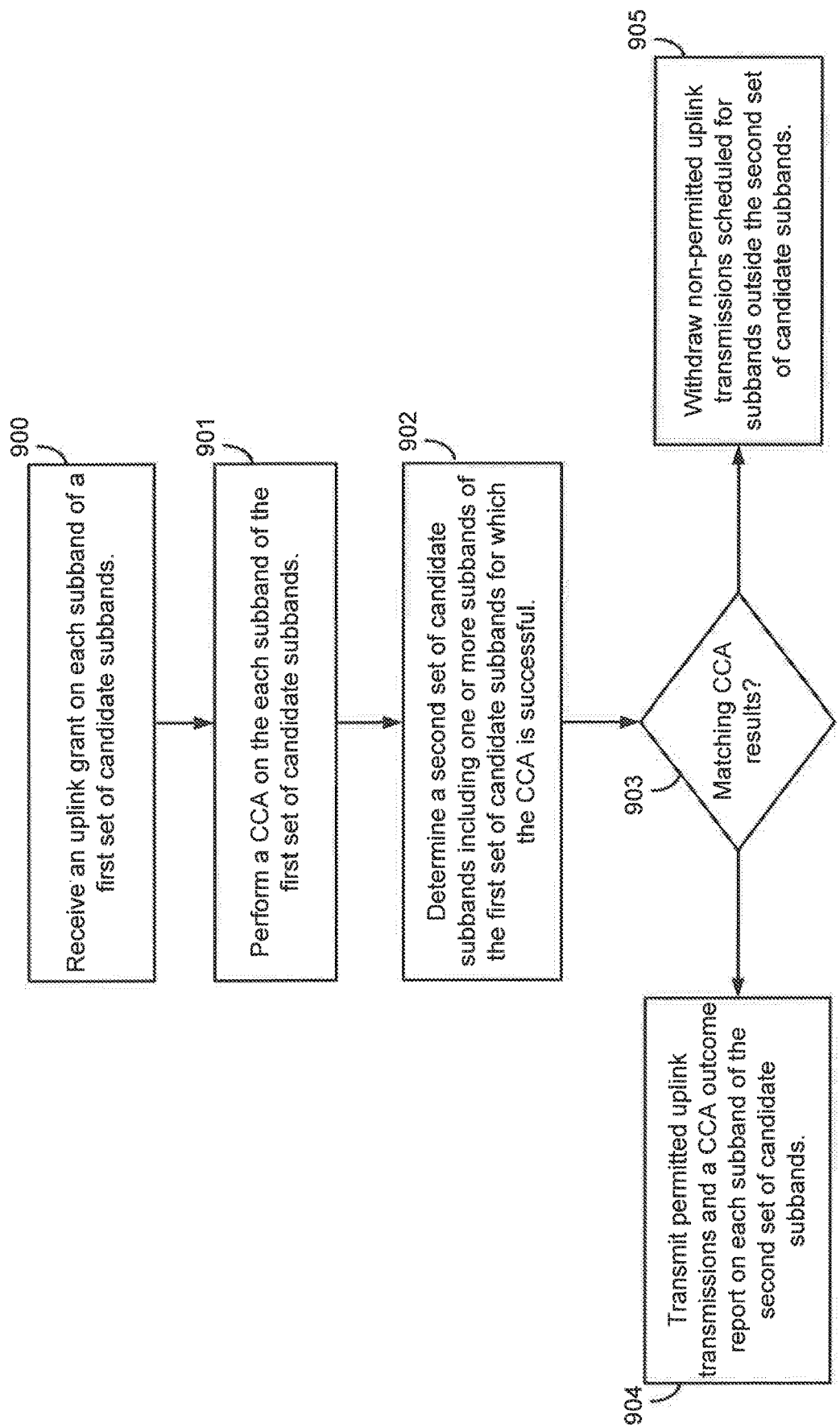
FIGS. 9A and 9B are block diagrams illustrating example blocks executed to implement one aspect of the present disclosure.

FIG. 9A is a block diagram illustrating example blocks executed to implement one aspect of the present disclosure. The example blocks will also be described with respect to UE 115 as illustrated in FIG. 11.

At block 900, a UE receives an uplink grant from a serving base station, wherein the uplink grant is received on each subband of a first set of candidate subbands. For example, UE 115 receives the uplink grant for transmissions of uplink data 1101 and subband identification via antennas 252a-r and wireless radios 1100a-r. The uplink grant details are stored at UL grant 1101 and the subband identification is stored at UL subbands 1104, in memory 282. The serving base station selects each of the subbands of the available bandwidth having a successful CCA result for the first set of candidate subbands identified to UE 115. The uplink grant identifies each of the candidate subbands as the subbands on which the full grant is transmitted by the base station.

As noted above, upon detection of CCA result information from the base station via the first set of candidate subbands, the UE can conserve power by de-activating the subbands corresponding to the system-allocated subbands for which the CCA failed or de-activated dynamically to implement interference coordination measures with neighboring cells.

At block 901, the UE performs a CCA on the each subband of the first set of candidate subbands. The uplink grant may include an LBT trigger or, alternatively, the UE may be semi-persistently scheduled to perform its LBT procedure. UE 115, under control of controller/processor 280, executes CCA logic 1103, in memory 282. The execution environment of CCA logic 1103 provides for UE 115 to perform the CCA on each of the first set of candidate subbands on receipt of the trigger.

At block 902, the UE determines a second set of candidate subbands including one or more subbands of the first set of candidate subbands for which the CCA is successful. UE 115, under control of controller processor 280, selects each of the subbands of the first set of candidate subbands having a successful CCA result for the second set of candidate subbands and stores the refined subbands of the second set to UL subbands 1104.

At block 903, a determination is made whether the CCA results identified by the second set of candidate subbands matches the CCA results identified by the first set of candidate subbands. In preparation for uplink transmissions, UE 115, under control of controller/processor 280, executes transmission behaviors logic 1105. If the first and second sets of candidate subbands match, then, at block 904, the UE transmits permitted uplink transmissions and a CCA outcome report on each subband of the second set of candidate subbands, wherein the permitted uplink transmissions were scheduled on a subband of the first set of candidate subbands corresponding to the each subband of the second set of candidate subbands and the CCA outcome report includes a CCA outcome for the CCA on the first set of candidate subbands. When the CCA results of the base station and UE 115 match, as determined by the makeup of the first and second sets of candidate subbands including the same set of subbands, the execution environment of transmission behaviors 1105 allows UE 115 to transmit the uplink data via wireless radios 1101a-r and antennas 252a-r, as scheduled on the subbands by the uplink grant. UE 115 also transmits CCA success indicator 1106 which identifies the CCA results for the CCA it performed. CCA success indicator 1106 includes results of other subbands. The serving base station may then use this cross-band CCA results information to further refine the selected candidate subbands.

Otherwise, if the determination at block 903 identifies that the first and second sets of candidate subbands do not match, then, at block 904, the UE withdraws non-permitted uplink transmissions scheduled for one or more subband of the first set of candidate subbands outside of the second set of candidate subbands. As previously noted, the CCA results of UE 115 may not match the CCA results of the base station. Thus, when the second set of candidate subbands does not match the first set of candidate subbands, UE 115 prepares its uplink transmissions according to multiple optional behaviors. The execution environment of transmission behaviors logic 1105 causes UE 115 to select the transmission behavior for the uplink transmissions according to the optional behaviors described herein. When the CCA results of the base station and UE 115 are determined not to match, as determined by the second set of candidate subbands being a subset of the subbands of the first set of candidate subbands (where subset, for purposes of this disclosure, identifies fewer than the full set of the related set), the uplink data scheduled for the subbands having an unsuccessful CCA by UE 115 may be withdrawn. Thus, only the uplink data scheduled for the successful CCA subbands of the second set of candidate subbands will be transmitted.

It should be noted that, as noted in prior described example aspects, the UE may further refine the selection of the final transmission subbands using calculated channel quality information or additional LBT results. In such aspects, the uplink data will be transmitted on the further refined set of subbands.

Figure 9B:
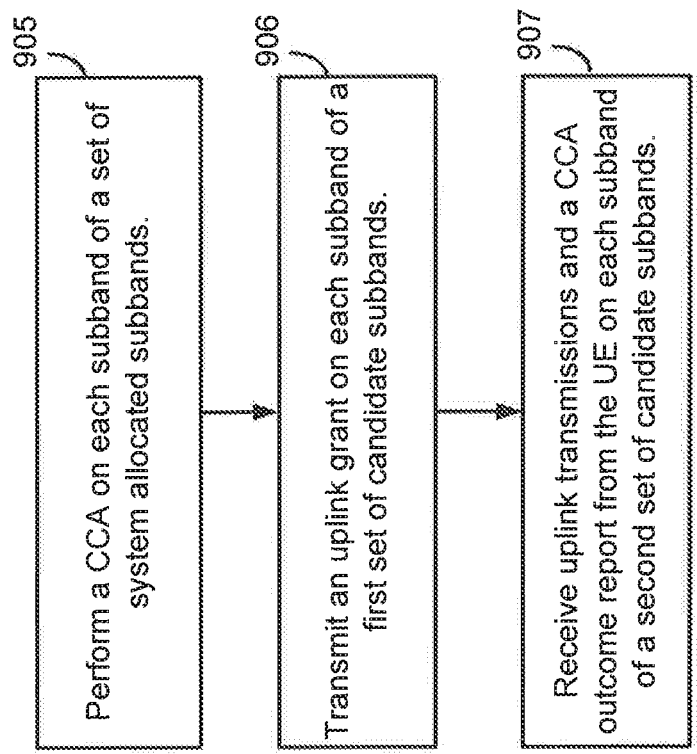

FIG. 9B is a block diagram illustrating example blocks executed to implement one aspect of the present disclosure.

The example blocks will also be described with respect to base station 105 as illustrated in FIG. 12.

At block 905, a base station performs a CCA on each subband of a set of system allocated subbands. As noted, base station 105, under control of controller/processor 240, executes CCA logic 1201, stored in memory 242. The execution environment of CCA logic 1201 provides for base station 105 to perform a CCA on each subband of the available bandwidth allocated by the network and selects each of the subbands of the available bandwidth having a successful CCA result for the first set of candidate subbands. The selected first set of candidate subbands for the served UE will be stored at UL transmission subbands 1202 in memory 242.

At block 906, the base station transmits an uplink grant to the at least one UE, wherein the uplink grant is transmitted on each subband of a first set of candidate subbands, the first set of candidate subbands including a plurality of subbands of the set of system allocated subbands for which the CCA is successful. Base station 105 generates the uplink grant via scheduler 244, under control of controller/processor 240, to be transmitted on the first set of candidate subbands. The uplink grant transmitted by base station 105 identifies the first set of candidate subbands for potential uplink transmission. The uplink grant may also include an LBT trigger or, alternatively, the UE may be semi-persistently scheduled to perform its LBT procedure, The uplink grant from the base station may also include a base station CCA outcome report that identifies cross-band CCA results either of the first set of candidate subbands or all results for all of the subbands of the set of system allocated subbands. This cross-band CCA report of the base station can be configured as a supplementary field of the DCI.

At block 907, the base station receives uplink transmissions and a CCA outcome report from the at least one UE on each subband of a second set of candidate subbands, wherein the second set of candidate subbands includes one or more subbands of the first set of candidate subbands and the CCA outcome report includes a CCA outcome from the at least one UE for the first set of candidate subbands. As base station 105 receives the uplink transmissions on the second set of candidate subbands via wireless antennas 234a-t and wireless radios 1200-a-t, it also receives the CCA outcome report that includes the CCA results for multiple subbands, including the subband on which the CCA output report is received and other candidate subbands. In certain aspects, the other candidate subbands may include only the ones having a successful CCA at the UE (the second set of candidate subbands), while in alternative aspects the other candidate subbands may include all results, successful or unsuccessful, for each of the subbands of the first set of candidate subbands.

Figure 10:
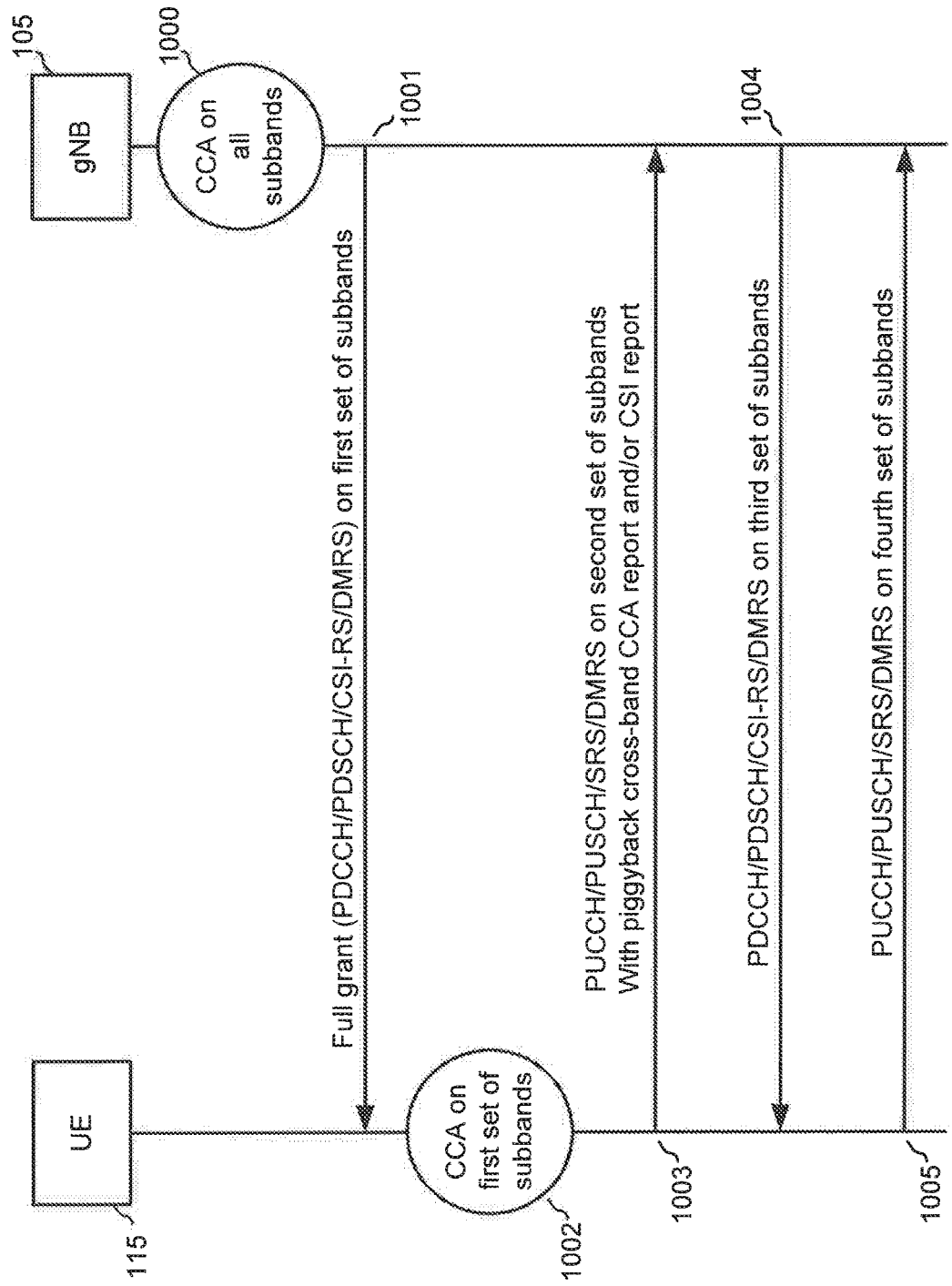
FIG. 10 is a communication flow diagram between a base station and a UE configured according to one aspect of the present disclosure.

FIG. 10 is a communication flow diagram between a base station 105 and a UE 115 configured according to one aspect of the present disclosure. According to the present aspect, uplink scheduling occurs using cross-band CCA reporting. Within an LBT window at 1000, base station 115 performs a CCA across all system allocated subbands. At 1001, base station 105 initial schedules UE 115 assuming both sides have consistent CCA reports across all subbands. The uplink/downlink scheduling decisions at 1001 may be carried by PDCCH/EPDCCH. Cross-band CCA outcomes can be configured as a supplementary field of DCI included in the scheduling at 1001. PDSCH can be multiplexed with PDCCH in the same subband. UE 115 searches for PDCCH and, if successfully detected, UE 115 knows it has been scheduled for uplink transmission. UE 115 would then perform an LBT procedure at 1002 and compares it's the cross-band CCA outcomes received with the uplink grant at 1001. If the CCA outcome from uplink grant is consistent with UE 115's CCA outcome on a particular subband, UE 115 follows the uplink grant and transmits, at 1003, on the corresponding subband with a cross-band CCA outcome report piggy-backed onto the uplink transmission. The cross-band CCA outcome report can be configured as a supplementary field of UCI, or modulated onto an SRS/DMRS sequence. If the CCA outcome of the uplink grant is inconsistent with UE 115's CCA outcome for a subband, UE 115 withdraws the scheduled uplink transmission on the blocked subband.

Base station 105 may refine the uplink scheduling for the next slot based on the cross-band CCA outcome report received from UE 115 at 1003. The cross-band CCA outcome report(s) about the availability of other subbands can help base station 105 to make more efficient scheduling decisions in next slot, which may avoid a subband failed UE LBT, or assist in load balancing across different sub-bands. At 1004, base station 105 may send the refined uplink scheduling with a third set of candidate subbands, which UE 115 may use to transmit any uplink data withdrawn based on the inconsistent CCA outcomes from 1002. Base station 105 may further refine uplink scheduling based on an updated CSI report, which can also be piggybacked on the cross-band CCA reports transmitted at 1003. UE 115 may then transmit any further uplink data at 1005 using the further refined uplink scheduling received at 1004.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 5, 7A, 7B, 9A, and 9B may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium. may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
  receiving, by a user equipment (UE), an uplink grant and an identification of a first set of candidate subbands from a serving base station, wherein the identification includes a clear channel assessment (CCA) trigger for the UE;
  performing, by the UE, a CCA on each subband of the first set of candidate subbands;
  transmitting, by the UE, a CCA success indicator to the serving base station, wherein the CCA success indicator is transmitted on each subband of a second set of candidate subbands, the second set of candidate subbands including one or more subbands of the first set of candidate subbands for which the CCA is successful; and
  preparing, by the UE, uplink transmissions in response to the second set of candidate subbands being a subset of the first set of candidate subbands, wherein the preparing the uplink transmissions includes puncturing one or more of the uplink transmissions scheduled for a subband of the first set of candidate subbands not included in the second set of candidate subbands, rate matching at least one of the uplink transmissions to fit within the second set of candidate subbands, or both.

2. The method of claim 1, further including:
  transmitting remaining data of the uplink transmissions using the second set of candidate subbands.

3. The method of claim 1, wherein rate matching the at least one of the uplink transmissions includes rate matching a reduced portion of the uplink transmissions according to a rate matching scheme to fit within the second set of candidate subbands, and further including:
  transmitting the reduced portion of the uplink transmissions using the second set of candidate subbands; and
  signaling to the serving base station notification of the rate matching scheme.

4. The method of claim 1, further including:
  identifying, by the UE, one or more system allocated subbands outside of the first set of candidate subbands; and
  deactivating, by the UE, the identified one or more system allocated subbands.

5. The method of claim 4, further including:
  receiving, at the UE, a subband wake-up signal from the serving base station; and
  reactivating, by the serving base station, the one or more system allocated subbands in response to the subband wake-up signal.

6. The method of claim 1, wherein the CCA success indicator is distinct from and is transmitted prior to the uplink transmissions.

7. The method of claim 1, wherein the uplink grant indicates success of CCAs performed with respect to the first set of candidate subbands by the serving base station.

8. A method of wireless communications, comprising:
receiving, by a user equipment (UE), an uplink pre-grant signal from a serving base station, wherein the uplink pre-grant signal is received on each subband of a first set of candidate subbands;
performing, by the UE, a clear channel assessment (CCA) on each subband of the first set of candidate subbands;
transmitting, by the UE, a CCA success indicator to the serving base station, wherein the CCA success indicator is transmitted on each subband of a second set of candidate subbands, the second set of candidate subbands including one or more subbands of the first set of candidate subbands for which the CCA was successful;
receiving, by the UE, an uplink grant from the serving base station, wherein the uplink grant is received on each subband of a third set of candidate subbands, the third set of candidate subbands including one or more of the second set of candidate subbands;
preparing, by the UE, uplink transmissions for a fourth set of candidate subbands that is a subset of the third set of candidate subbands, wherein the preparing the uplink transmissions includes puncturing one or more of the uplink transmissions scheduled for a subband of the third set of candidate subbands not included in the fourth set of candidate subbands, rate matching at least one of the uplink transmissions to fit within the fourth set of candidate subbands, or both; and
transmitting, by the UE, the uplink transmissions to the serving base station using the fourth set of candidate subbands, wherein the fourth set of candidate subbands includes one or more of the third set of candidate subbands.

9. The method of claim 8, wherein the uplink pre-grant is included in one of:
a UE-specific unicast transmission from the serving base station; or
a common downlink control channel.

10. The method of claim 8, further including:
measuring, by the UE, channel quality for each subband of the third set of candidate subbands, wherein the channel quality is determined based on signals received with the uplink grant; and
identifying, by the UE, the one or more of the third set of candidate subbands for the fourth set of candidate subbands based on the channel quality.

11. The method of claim 8, further including:
performing, by the UE, a listen before talk (LBT) procedure on each subband of the third set of candidate subbands prior to the transmitting the uplink transmissions; and
identifying, by the UE, the one or more of the third set of candidate subbands based on a result of the LBT procedure.

12. The method of claim 8, further including:
identifying, by the UE, one or more system allocated subbands outside the first set of candidate subbands; and
deactivating, by the UE, the identified one or more system allocated subbands.

13. The method of claim 12, further including:
receiving, at the UE, a subband wake-up signal from the serving base station; and
reactivating, by the serving base station, the one or more system allocated subbands in response to the subband wake-up signal.

14. A method of wireless communication, comprising:
performing, by a base station, a clear channel assessment (CCA) on each subband of a set of system allocated subbands;
transmitting, by the base station, an uplink pre-grant signal to at least one user equipment (UE), wherein the uplink pre-grant signal is transmitted on each subband of a first set of candidate subbands, the first set of candidate subbands including a plurality of subbands of the set of system allocated subbands for which the CCA is successful;
receiving, by the base station, a CCA success indicator from the at least one UE, wherein the CCA success indicator is transmitted on each subband of a second set of candidate subbands, the second set of candidate subbands including one or more subbands of the first set of candidate subbands;
transmitting, by the base station, an uplink grant to the at least one UE, wherein the uplink grant is transmitted on each subband of a third set of candidate subbands, the third set of candidate subbands including one or more of the second set of candidate subbands; and
receiving, by the base station, uplink transmissions from the at least one UE using a fourth set of candidate subbands, wherein the fourth set of candidate subbands includes one or more of the third set of candidate subbands, and wherein the uplink transmissions are prepared by the UE by puncturing one or more of the uplink transmissions scheduled for a subband of the third set of candidate subbands not included in the fourth set of candidate subbands, by rate matching at least one of the uplink transmissions to fit within the fourth set of candidate subbands, or both.

15. The method of claim 14, wherein the uplink pre-grant is included in one of:
a UE-specific unicast transmission to the at least one UE; or
a common downlink control channel.

16. The method of claim 14, further including:
measuring, by the base station, channel quality for each subband of the second set of candidate subbands, wherein the channel quality is determined based on signals received with the CCA success indicator; and
identifying, by the base station, the one or more of the second set of candidate subbands for the third set of candidate subbands based on the channel quality.

17. A method of wireless communication, comprising:
receiving, by a user equipment (UE), an uplink grant from a serving base station, wherein the uplink grant is received on each subband of a first set of candidate subbands;
performing, by the UE, a clear channel assessment (CCA) on the each subband of the first set of candidate subbands;
determining, by the UE, a second set of candidate subbands including one or more subbands of the first set of candidate subbands for which the CCA is successful;
preparing, by the UE, first uplink transmissions for the second set of candidate subbands, wherein the preparing the first uplink transmissions includes puncturing one or more of the first uplink transmissions scheduled for a subband of the first set of candidate subbands not included in the second set of candidate subbands, rate matching at least one of the first uplink transmissions to fit within the second set of candidate subbands, or both;

transmitting, by the UE, first uplink transmissions and a CCA outcome report on each subband of the second set of candidate subbands, wherein the first uplink transmissions were scheduled on a subband of the first set of candidate subbands corresponding to the each subband of the second set of candidate subbands and the CCA outcome report includes a CCA outcome for the CCA on the first set of candidate subbands; and withdrawing, by the UE, second uplink transmissions scheduled for one or more subband of the first set of candidate subbands outside of the second set of candidate subbands.

18. The method of claim 17, wherein the transmitting further includes transmitting an updated channel state information with the CCA outcome report.

19. The method of claim 17, further including:
receiving, by the UE, a refined uplink scheduling for a next slot from the serving base station, wherein the refined uplink scheduling includes identification of a third set of candidate subbands, the third set of candidate subbands including one or more of the second set of candidate subbands; and transmitting additional uplink transmissions to the serving base station using the third set of candidate subbands.

20. The method of claim 17, wherein the CCA outcome includes one of:
the CCA outcome for each subband of the first set of candidate subbands; or
the CCA outcome for each subband of the second set of candidate subbands.

21. The method of claim 17, further including:
identifying, by the UE, one or more system allocated subbands outside of the first set of candidate subbands; and
deactivating, by the UE, the identified one or more system allocated subbands.

22. The method of claim 21, further including:
receiving, at the UE, a subband wake-up signal from the serving base station; and
reactivating, by the serving base station, the one or more system allocated subbands in response to the subband wake-up signal.

* * * * *